(12) United States Patent
Howard

(10) Patent No.: US 11,000,887 B2
(45) Date of Patent: May 11, 2021

(54) APPARATUSES AND METHODS FOR APPLYING PRESSURE TO EDGE SURFACES

(71) Applicant: The Boeing Company, Chicago, IL (US)

(72) Inventor: Jesse P. Howard, Arlington, WA (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 16/421,904

(22) Filed: May 24, 2019

(65) Prior Publication Data

US 2020/0368797 A1  Nov. 26, 2020

(51) Int. Cl.
*B21B 1/16* (2006.01)
*B21B 39/14* (2006.01)
(Continued)

(52) U.S. Cl.
CPC ............... *B21B 1/16* (2013.01); *B21B 39/14* (2013.01); *B25B 1/02* (2013.01); *B25B 5/02* (2013.01);
(Continued)

(58) Field of Classification Search
CPC . B23Q 1/76; B23Q 3/06; B23Q 1/527; B23Q 3/064; B23Q 7/003; B23Q 7/042; B25B 1/205; B25B 5/02; B25B 5/14; B25B 5/163; B25B 5/166; B25B 1/02; B25B 1/08; B25B 1/20; B25B 1/24; B25B 1/2457; B25B 1/2473; B25B 5/145; B25B 1/22; B25B 5/006; B25B 5/147; B30B 3/00; B30B 3/005; B30B 3/02; B30B 3/04; B30B 3/045; B30B 3/06; B30B 5/00; B30B 7/00; B30B 9/00; B30B 9/24; B30B 9/241;
(Continued)

(56) References Cited

U.S. PATENT DOCUMENTS 3,789,960 A * 2/1974 Warren ................... F16D 63/00
188/74
4,088,221 A * 5/1978 Bowser .............. B65G 47/8815
193/35 A (Continued)

OTHER PUBLICATIONS

Howard, Jesse P., Apparatuses and Methods for Applying Pressure to Edge Surfaces, U.S. Appl. No. 16/421,896, filed May 24, 2019.
(Continued)

*Primary Examiner* — Joseph J Hail
*Assistant Examiner* — Timothy B Brady
(74) *Attorney, Agent, or Firm* — Kwan & Olynick LLP

(57) ABSTRACT

An apparatus for applying pressure to at least a portion of an edge surface, which bridges opposing faces of a workpiece, comprises a frame, a first roller, a second roller, a rotation-control member, a first biasing member, and a second biasing member. The first roller and the second roller are coupled to the frame, rotatable relative to the frame about a first pivot axis, and translationally fixed relative to the frame. The rotation-control member is movable relative to the frame, controlling rotation of the first roller and the second roller relative to the frame. The first biasing member is coupled to the frame and is configured to operate in tension. The second biasing member is positioned, in compression, between the frame and the rotation-control member.

20 Claims, 11 Drawing Sheets

(51) Int. Cl.
*B25B 5/02* (2006.01)
*B25B 5/16* (2006.01)
*B25B 1/02* (2006.01)
*B65G 7/04* (2006.01)
*F16D 49/00* (2006.01)
*F16D 63/00* (2006.01)
*B65G 13/075* (2006.01)

(52) U.S. Cl.
CPC .............. *B25B 5/163* (2013.01); *B25B 5/166* (2013.01); *B65G 7/04* (2013.01); *B65G 13/075* (2013.01); *B65G 2205/00* (2013.01); *F16D 49/00* (2013.01); *F16D 63/00* (2013.01)

(58) Field of Classification Search
CPC ......... B30B 9/242; B30B 9/245; B30B 9/246; B30B 9/247; B30B 9/28; B30B 11/00; B30B 11/006; B30B 5/02; B65G 7/12; B65G 49/061; B65G 13/075; B65G 2205/04; B65G 67/08; B65G 47/8815; B65G 13/02; B65G 2205/00; B65G 2205/06; B65G 7/04; B66C 1/48; F16D 49/00; F16D 63/00; B65D 2585/687; B65D 85/68
USPC ........................................................ 188/72.7
See application file for complete search history.

(56) References Cited

U.S. PATENT DOCUMENTS

| | | | | |
|---|---|---|---|---|
| 4,465,422 A * | 8/1984 | Blust, Sr. | ................. | B23Q 1/76 408/45 |
| 4,658,940 A * | 4/1987 | Ulmann | ................... | F16D 41/08 188/161 |
| 4,759,429 A * | 7/1988 | Margetts | ................ | F16D 65/22 188/343 |
| 4,770,070 A * | 9/1988 | Sowers | ...................... | B25B 7/00 81/418 |
| 5,249,487 A * | 10/1993 | Armfield, IV | .......... | B25B 23/00 81/186 |
| 5,257,923 A * | 11/1993 | Kagawa | ..................... | B30B 3/04 425/290 |
| 5,478,190 A * | 12/1995 | Helton | ...................... | B60P 1/52 193/35 A |
| 6,382,610 B1 * | 5/2002 | Corbin | .................... | B25B 1/205 269/130 |
| 6,458,022 B1 * | 10/2002 | Folz | ......................... | B23Q 1/76 269/196 |
| 7,263,917 B1 * | 9/2007 | Benysh | ................. | B25B 13/481 81/186 |
| 8,662,260 B2 * | 3/2014 | Baldeosingh | ........... | F16D 65/12 188/72.7 |
| 10,363,635 B2 * | 7/2019 | Claretti | ................ | B65G 1/1378 |
| 10,654,601 B2 * | 5/2020 | Giublin | ................... | B65B 5/067 |
| 2002/0113448 A1 * | 8/2002 | Kazerooni | ............... | B25J 15/00 294/86.4 |
| 2002/0125727 A1 * | 9/2002 | Kazerooni | .............. | B66C 1/445 294/86.4 |
| 2003/0032376 A1 * | 2/2003 | Ikeda | .................... | B24B 41/007 451/242 |
| 2004/0103826 A1 * | 6/2004 | Ponzio | ..................... | B23Q 3/18 108/55.3 |
| 2005/0034565 A1 * | 2/2005 | Drzewiecki | ........... | E21B 19/164 81/57.17 |
| 2006/0107798 A1 * | 5/2006 | Falzone | .................. | B25B 17/00 81/57.3 |
| 2006/0288752 A1 * | 12/2006 | Burzlaff | ................ | B21D 39/021 72/220 |
| 2007/0209194 A1 * | 9/2007 | Bradfield | ............... | H01F 41/064 29/605 |
| 2008/0041245 A1 * | 2/2008 | Judocus | ................. | B01D 33/70 100/118 |
| 2013/0087054 A1 * | 4/2013 | Frangenberg | ............. | B30B 3/04 100/35 |
| 2013/0129887 A1 * | 5/2013 | Hoppe | .................... | B30B 15/34 426/479 |
| 2013/0223956 A1 * | 8/2013 | Gostylla | .................. | B21J 15/32 411/501 |
| 2014/0041972 A1 * | 2/2014 | Kim | ........................ | F16D 49/00 188/74 |
| 2014/0094099 A1 * | 4/2014 | Hildebrandt | ............ | B24B 21/20 451/303 |
| 2014/0150236 A1 * | 6/2014 | Kempf | .................... | A63J 1/028 29/428 |
| 2014/0255129 A1 * | 9/2014 | Kenner | ................. | B23B 13/123 414/14 |
| 2014/0345431 A1 * | 11/2014 | Pierce | ................ | B23D 57/0084 83/72 |
| 2018/0056486 A1 * | 3/2018 | Liao | ......................... | B25B 5/04 |
| 2018/0326590 A1 * | 11/2018 | Masuda | ............... | B24B 27/0038 |
| 2019/0076569 A1 * | 3/2019 | Peterson | ................... | A61L 9/20 |
| 2019/0389098 A1 * | 12/2019 | Stone | ................. | B29D 99/0014 |

OTHER PUBLICATIONS

Howard, Jesse P., Apparatuses and Methods for Applying Pressure to Edge Surfaces, U.S. Appl. No. 16/421,900, filed May 24, 2019.
Howard, Jesse P., Apparatuses and Methods for Applying Pressure to Edge Surfaces, U.S. Appl. No. 16/421,912, filed May 24, 2019.
Howard, Jesse P., Apparatuses and Methods for Applying Pressure to Edge Surfaces, U.S. Appl. No. 16/421,919, filed May 24, 2019.
Howard, Jesse P., Apparatuses and Methods for Applying Pressure to Edge Surfaces, U.S. Appl. No. 16/421,935, filed May 24, 2019.

* cited by examiner

Expanded View

APPARATUSES AND METHODS FOR APPLYING PRESSURE TO EDGE SURFACES

BACKGROUND

Applying pressure to edge surfaces of workpieces often requires a specialized clamping apparatus, which supports the workpiece to apply pressure to the edge surface of interest. However, some workpieces are too large to be supported by a clamping apparatus. Furthermore, conventional hand-held clamps are generally not suitable for applying edge pressure to large workpieces by virtue of their design.

SUMMARY

Accordingly, apparatuses and methods, intended to address at least the above-identified concerns, would find utility.

The following is a non-exhaustive list of examples, which may or may not be claimed, the subject matter, disclosed herein.

Disclosed herein is an apparatus for applying pressure to at least a portion of an edge surface, which bridges opposing faces of a workpiece. The apparatus comprises a frame, a first roller, a second roller, a rotation-control member, a first biasing member, and a second biasing member. The first roller is coupled to the frame, is rotatable relative to the frame about a first pivot axis, and is translationally fixed relative to the frame. The second roller is coupled to the frame, is rotatable relative to the frame about a second pivot axis, and is translationally fixed relative to the frame. The second pivot axis is spaced from the first pivot axis along a first axis, which intersects and is perpendicular to the first pivot axis and to the second pivot axis. The rotation-control member is coupled to the frame and is movable relative to the frame. The first biasing member is coupled to the frame and is configured to operate in tension. The second biasing member is positioned, in compression, between the frame and the rotation-control member. When the rotation-control member is at a first location relative to the frame, the first roller and the second roller are rotatable relative to the frame. When the rotation-control member is at a second location relative to the frame, the first roller and the second roller are rotationally fixed relative to the frame.

Apparatus is configured to apply the pressure to at least the portion of edge surface while apparatus is supported by workpiece. Apparatus can be installed on workpiece by an operator with minimal efforts, e.g., using only one hand. Furthermore, apparatus is configured to retain on workpiece, supported by opposing faces of workpiece. Apparatus applies the pressure uniformly using first biasing member, which is configured to operate in tension and conformally contact at least the portion of edge surface. The level of pressure is determined by stretching of first biasing member and, in some examples, is controllable by the degree of protrusion of workpiece into apparatus.

Also disclosed herein is a method of applying pressure to at least a portion of an edge surface, which bridges opposing faces of a workpiece. The method uses an apparatus that comprises a frame, a first roller, a second roller, a rotation-control member, a first biasing member, and a second biasing member. The first roller is coupled to the frame and is rotatable relative to the frame about a first pivot axis and is translationally fixed relative to the frame. The second roller is coupled to the frame and is rotatable relative to the frame about a second pivot axis and is translationally fixed relative to the frame. The second pivot axis is spaced from the first pivot axis along a first axis, which intersects and is perpendicular to the first pivot axis and to the second pivot axis. The rotation-control member is coupled to the frame and is movable relative to the frame. The first biasing member is coupled to the frame. The second biasing member is positioned, in compression, between the frame and the rotation-control member. The method comprises aligning the apparatus with the workpiece such that the edge surface of the workpiece is centered along a second axis, that is perpendicular to the first axis and that extends between the first pivot axis of the first roller and the second pivot axis of the second roller. The method further comprises positioning the rotation-control member at a first location relative to the frame such that the first roller and the second roller are rotatable relative to the frame. The method also comprises, with the rotation-control member positioned at the first location relative to the frame, moving the apparatus and the workpiece relative to each other, such that the workpiece is received between the first roller and the second roller, stretching the first biasing member so that the first biasing member applies the pressure to at least the portion of the edge surface of the workpiece, while the first roller and the second roller apply equal and opposite forces to opposing faces of the workpiece. The method additionally comprises positioning the rotation-control member at a second location relative to the frame, such that the first roller and the second roller are fixed relative to the frame, creating a frictional coupling between the apparatus and the workpiece, which maintains the pressure, applied to at least the portion of the edge surface by the first biasing member.

Aligning apparatus with workpiece such that edge surface of workpiece is centered along second axis ensures that workpiece can be later inserted between first roller and second roller. Furthermore, positioning rotation-control member at the first location relative to frame ensues that first roller and second roller are able rotatable relative to frame as, for example, is shown in FIG. 2B. The rotation of first roller and second roller allows for workpiece to be inserted between first roller and second roller.

BRIEF DESCRIPTION OF THE DRAWINGS

Figure 1A:
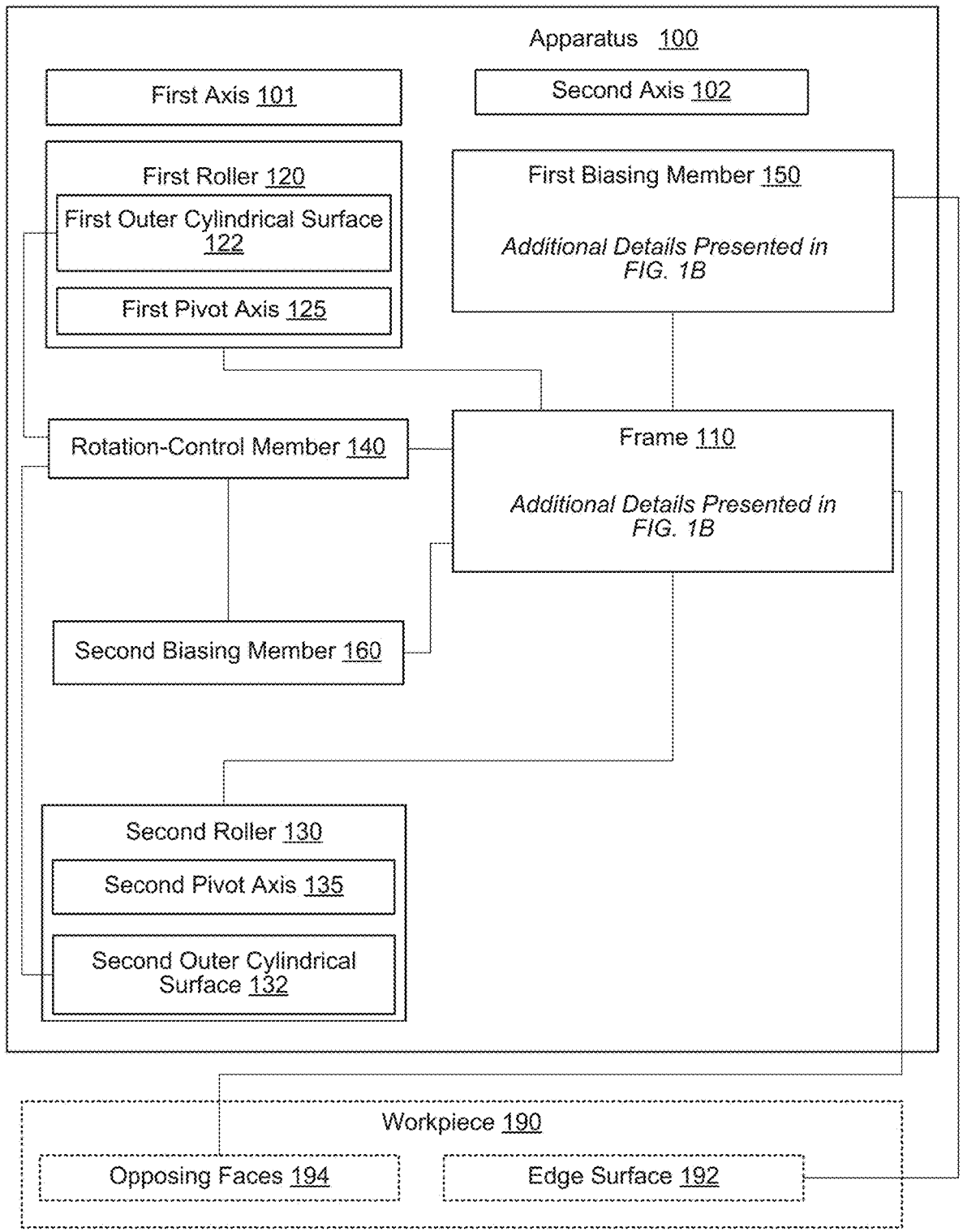
Figure 1B:
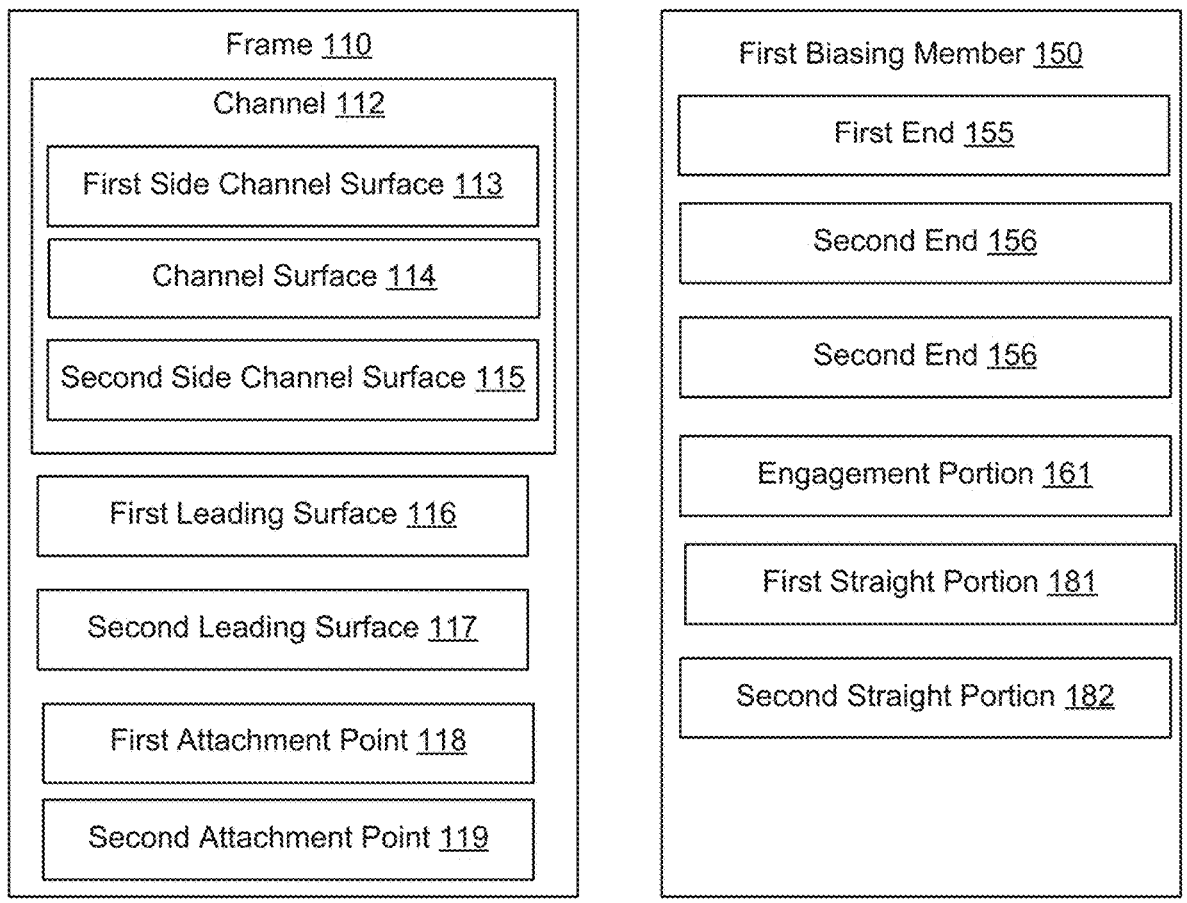
Figure 2A:
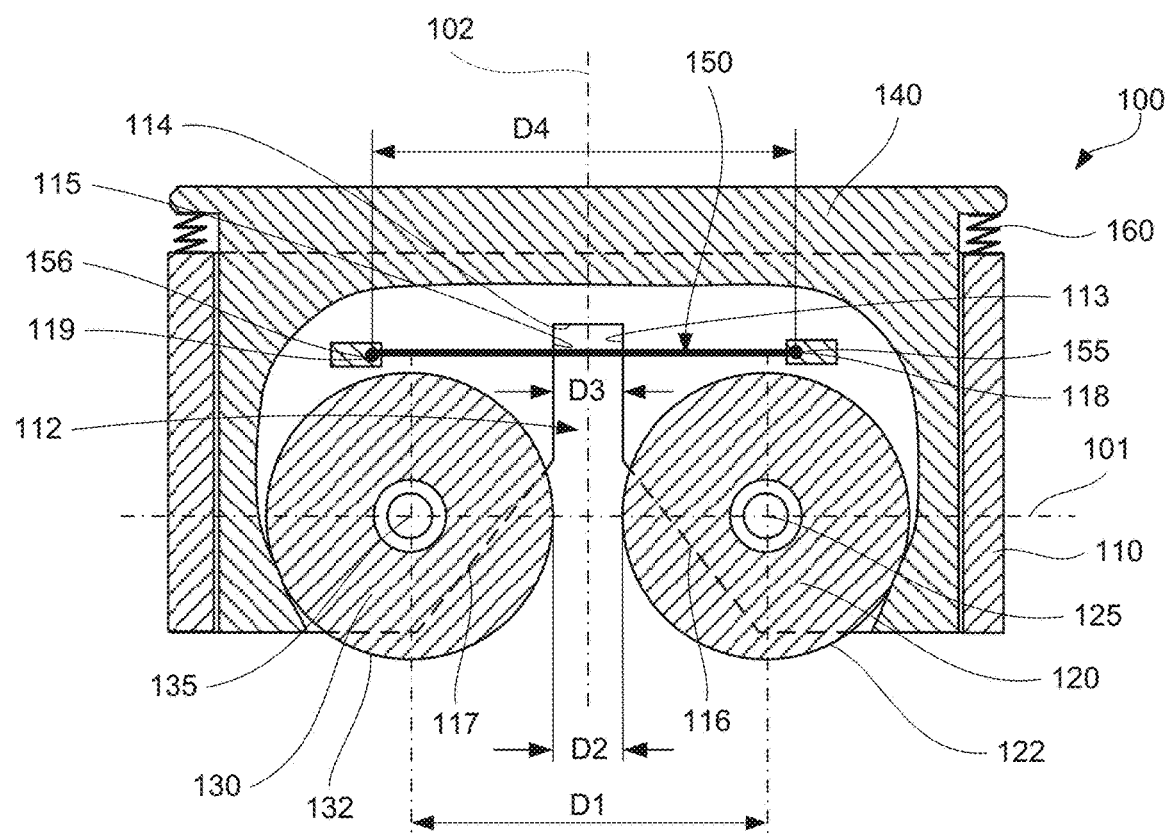
Figure 2B:
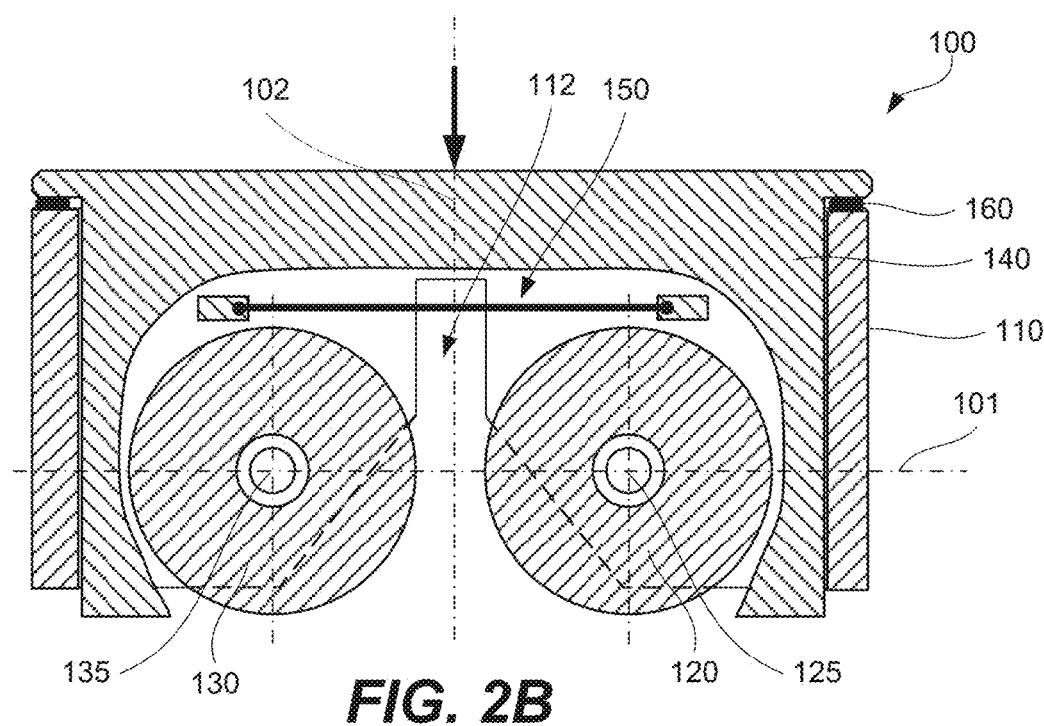
Figure 2C:
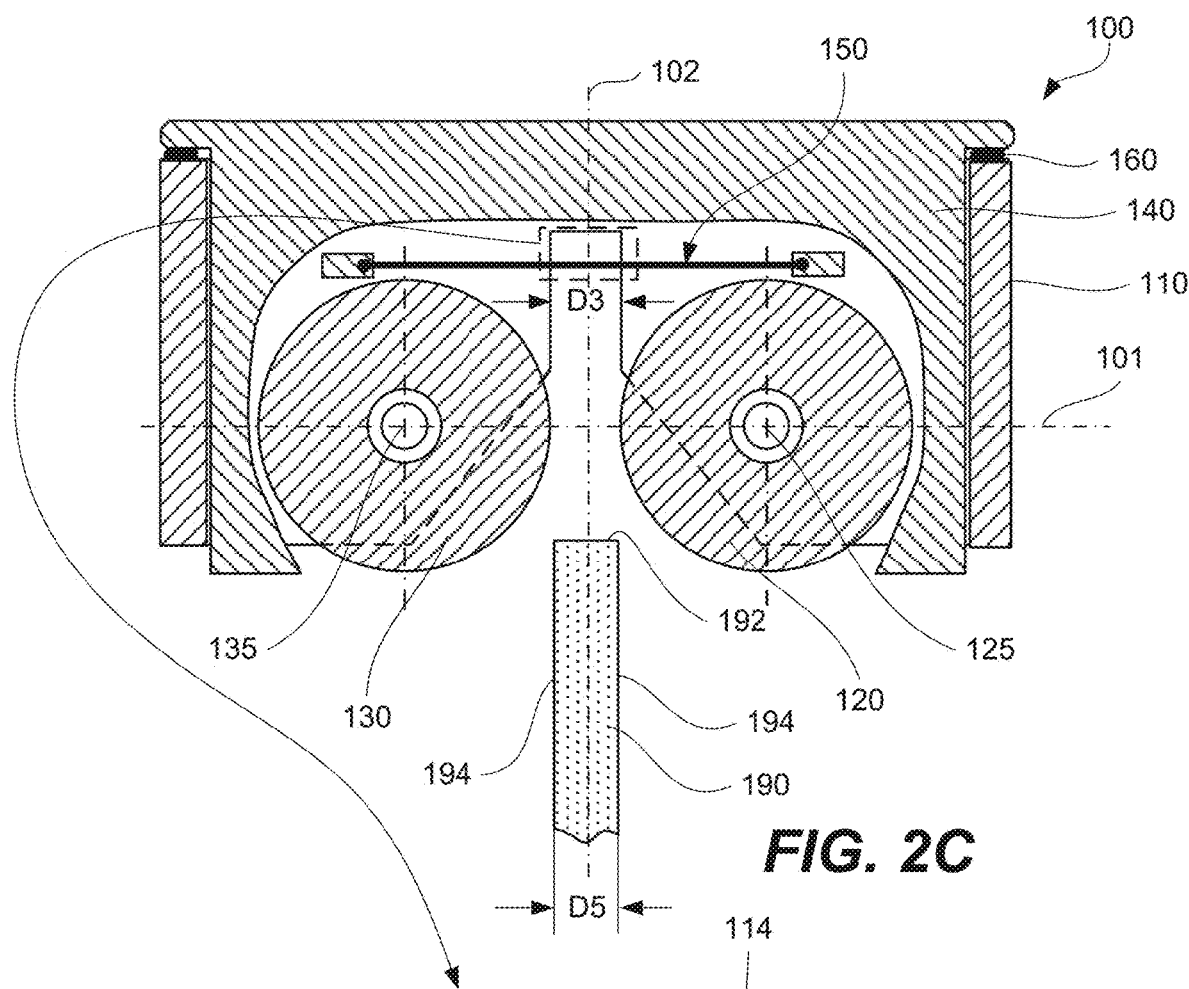
Figure 2D:
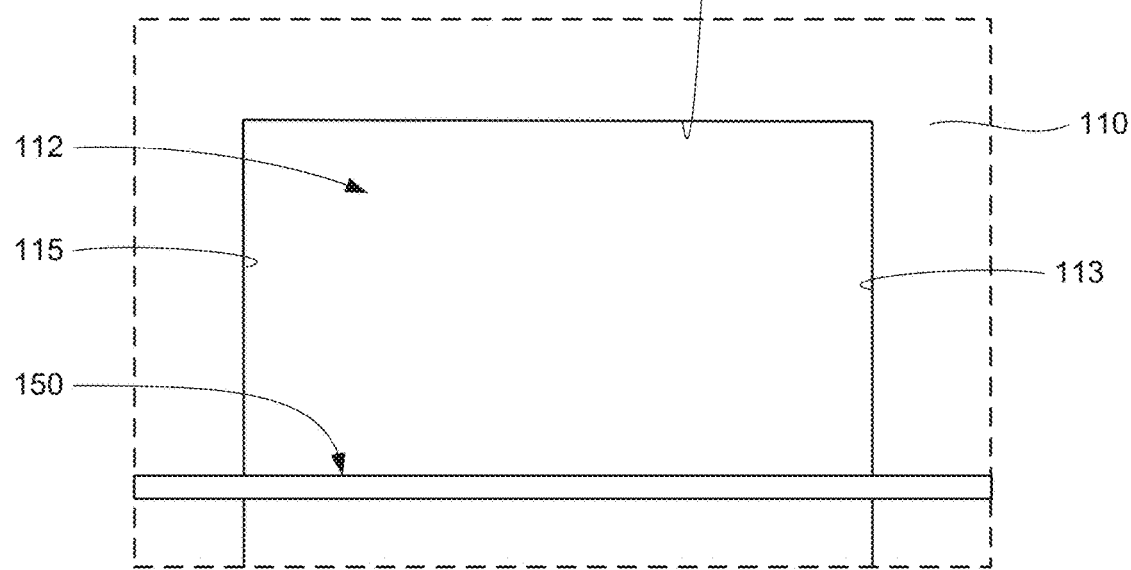
Figure 2E:
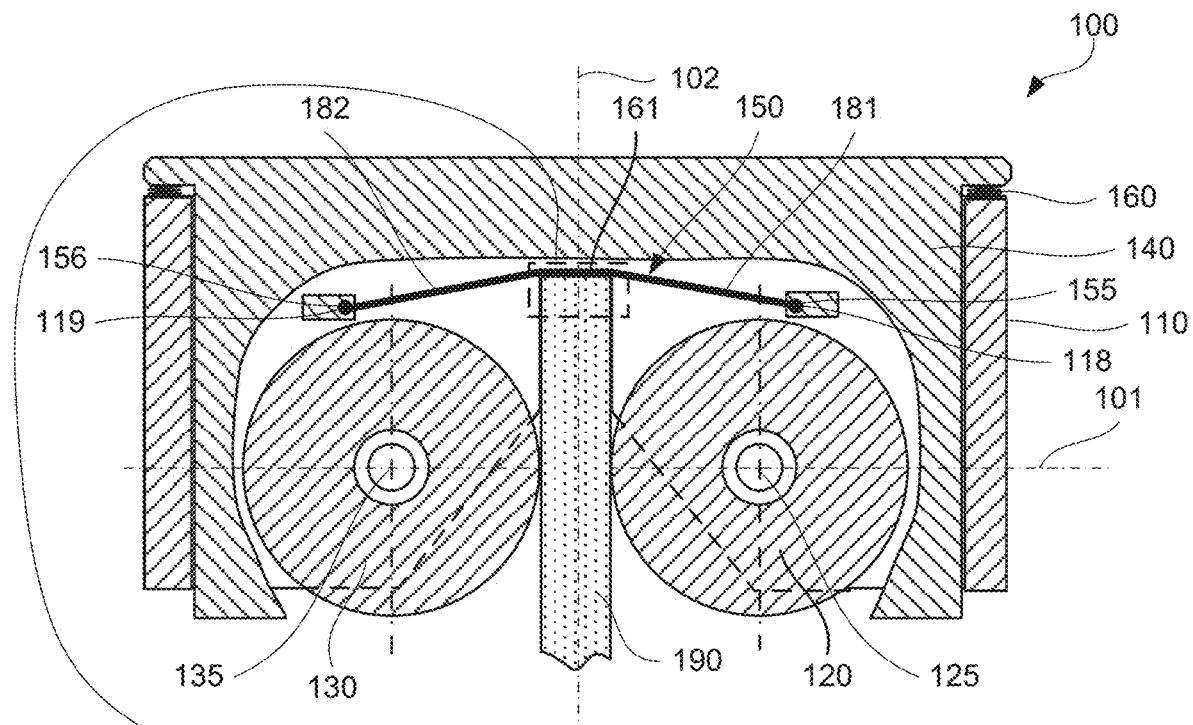
Figure 2F:
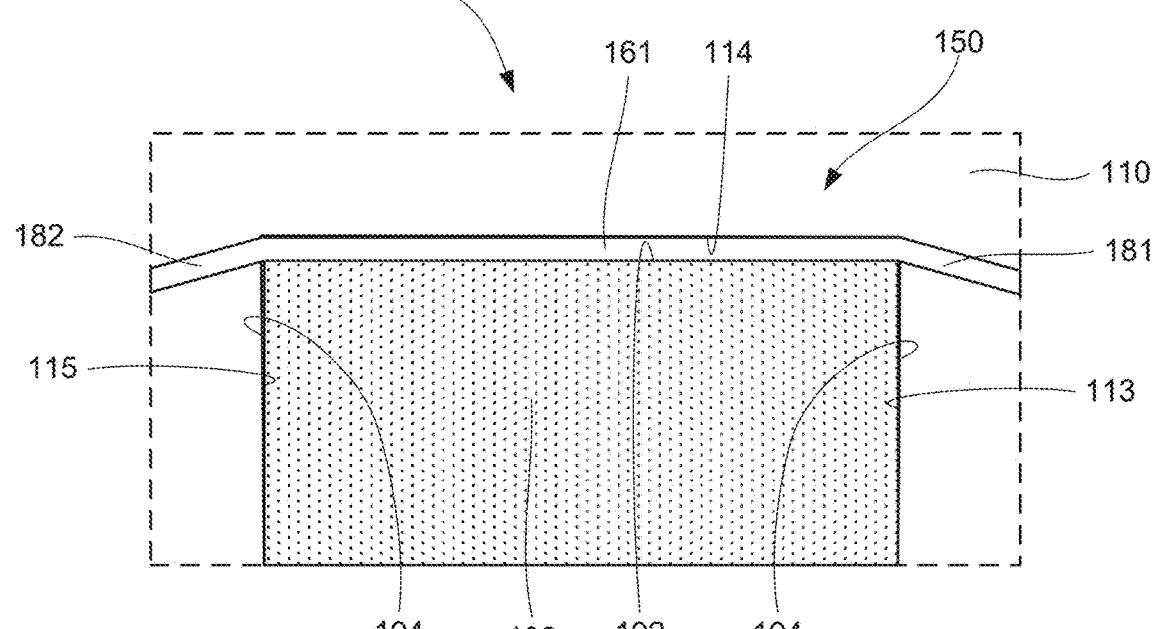
Figure 2G:
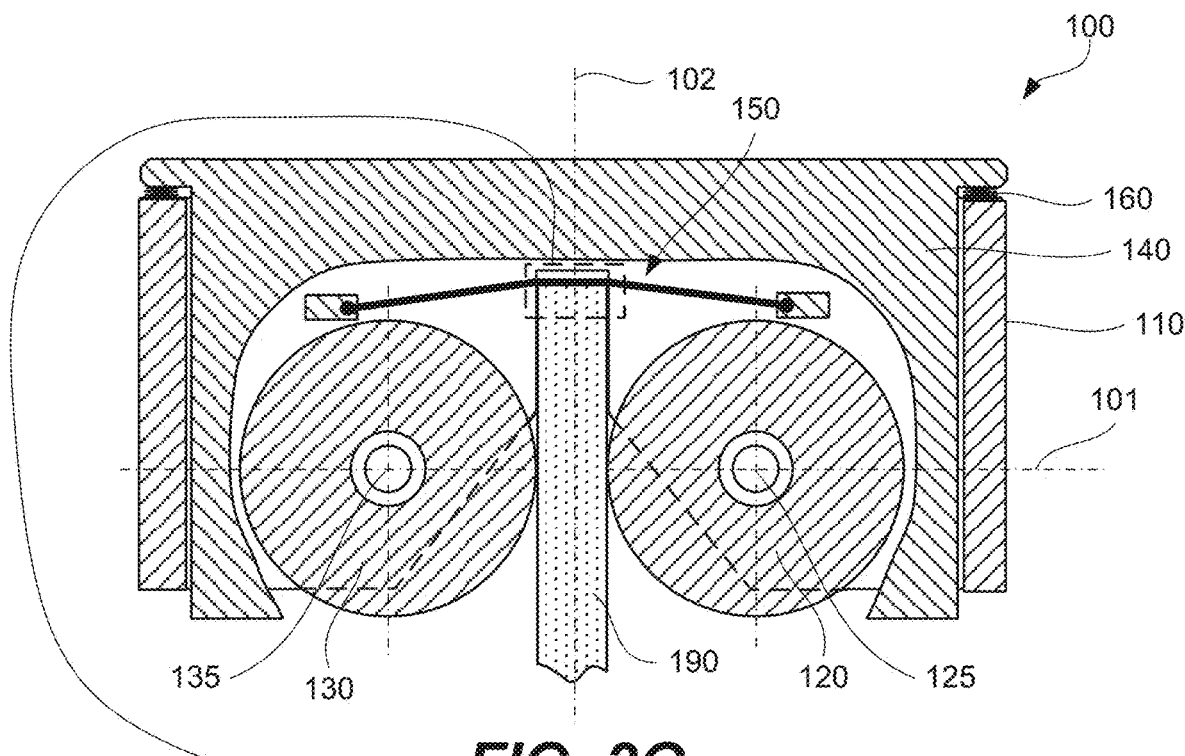
Figure 2H:
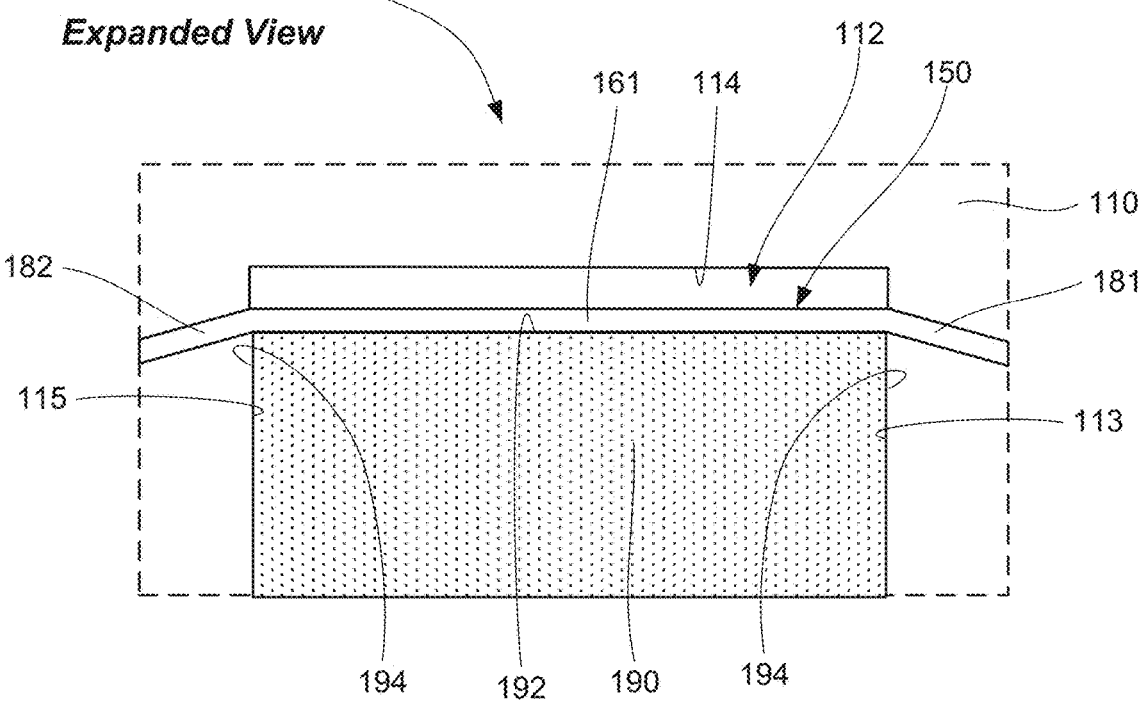
Figure 2I:
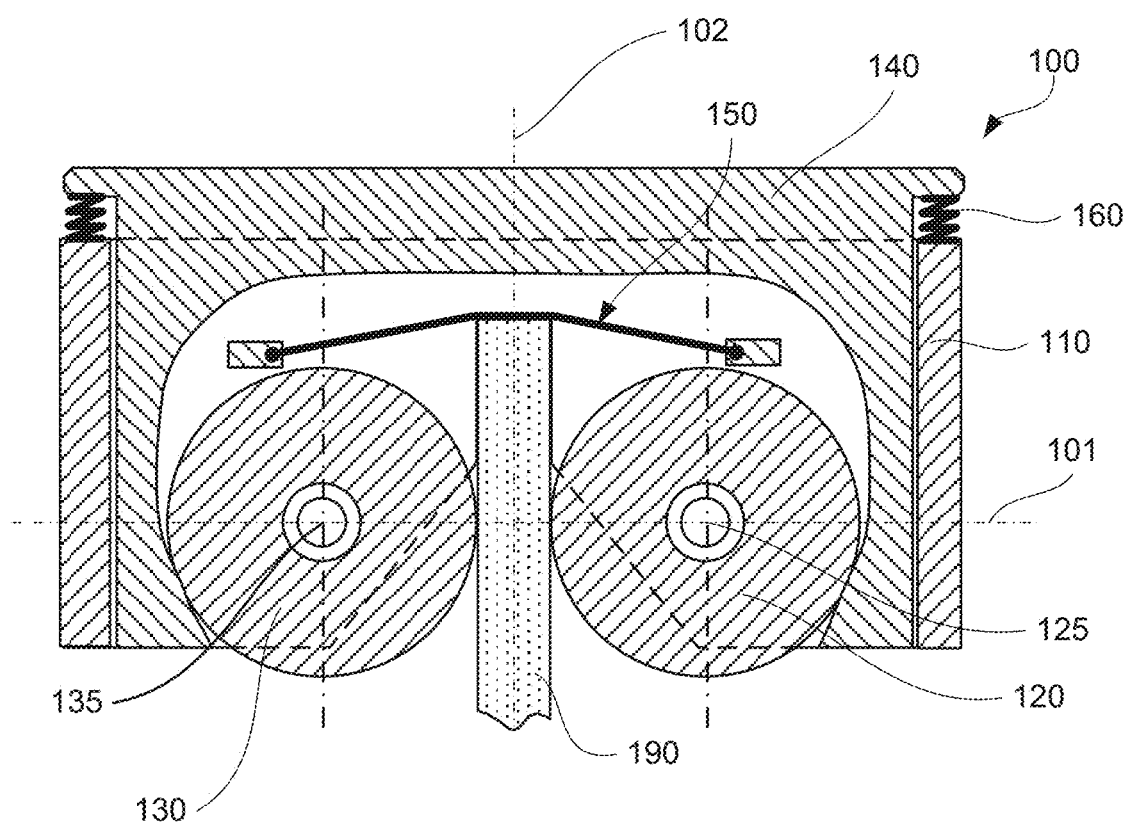
Figure 3:
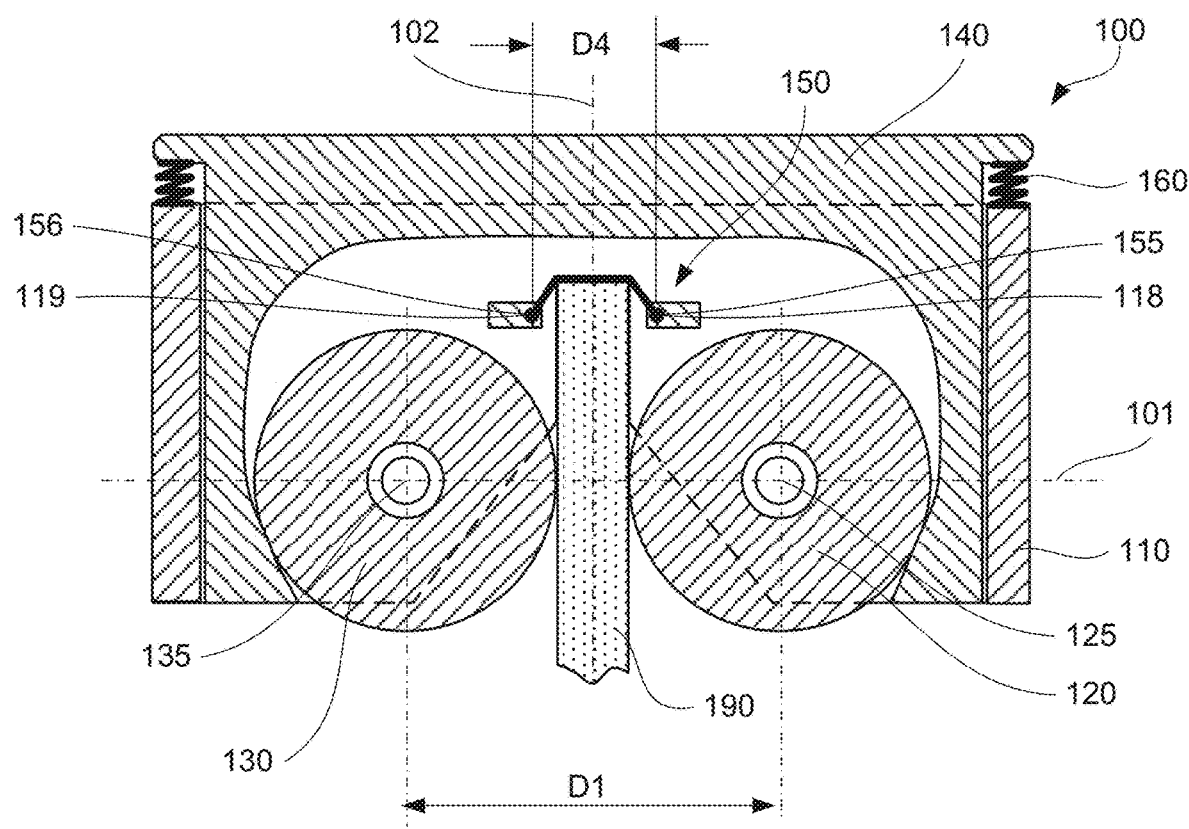
Figure 4:
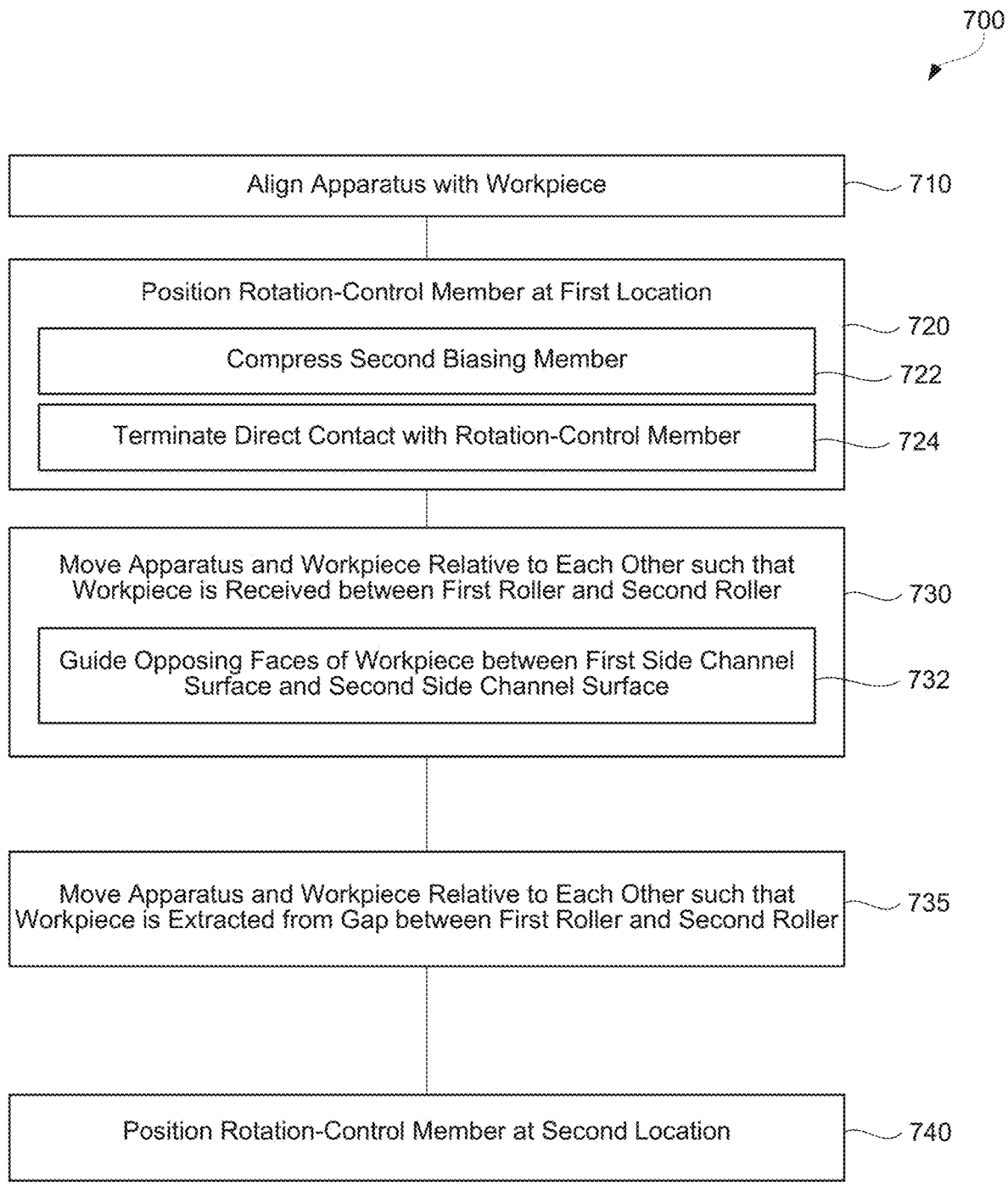
Figure 5:
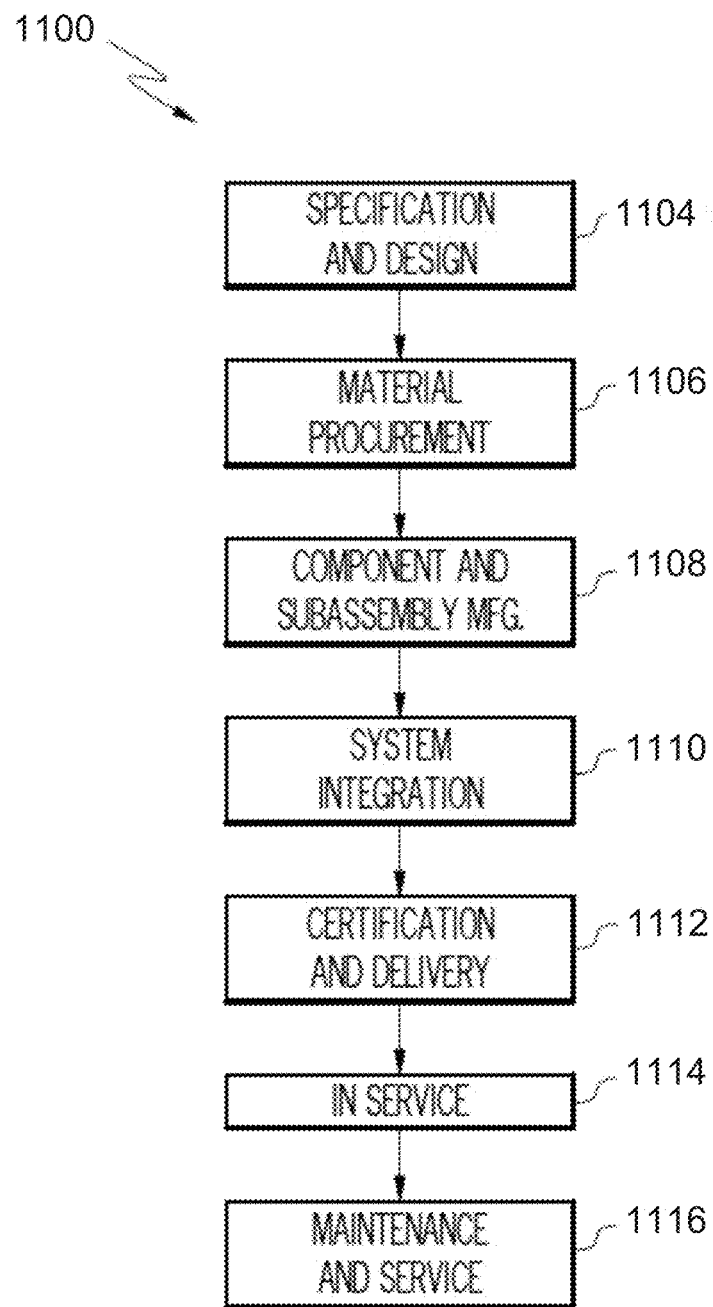

Having thus described one or more examples of the present disclosure in general terms, reference will now be made to the accompanying drawings, which are not necessarily drawn to scale, and wherein like reference characters designate the same or similar parts throughout the several views, and wherein:

FIGS. 1A and 1B are, collectively, a block diagram of an apparatus for applying pressure to at least a portion of an edge surface of a workpiece, according to one or more examples of the present disclosure;

FIG. 2A is a cross-sectional side view of the apparatus of FIGS. 1A and 1B with the rotation-control member of the apparatus at a second location relative to the frame, according to one or more examples of the present disclosure;

FIG. 2B is a cross-sectional side view of the apparatus of FIGS. 1A and 1B with the rotation-control member of the apparatus at a first location relative to the frame, according to one or more examples of the present disclosure;

FIG. 2C is a cross-sectional side view of the apparatus of FIGS. 1A and 1B, showing a workpiece aligned relative to the apparatus and prior to receiving the workpiece between the first roller and the second roller of the apparatus, according to one or more examples of the present disclosure;

FIG. 2D is an expanded view of a portion of FIG. 2C, illustrating a first biasing member and a channel of the apparatus of FIGS. 1A and 1B, according to one or more examples of the present disclosure;

FIG. 2E is a cross-sectional side view of the apparatus of FIGS. 1A and 1B after the workpiece is received between the first roller and the second roller of the apparatus, according to one or more examples of the present disclosure;

FIG. 2F is an expanded view of a portion of FIG. 2E, illustrating a first engagement portion of a first biasing member of the apparatus of FIGS. 1A and 1B, contacting the channel surface and positioned over and applying pressure on the edge surface and, according to one or more examples of the present disclosure;

FIG. 2G is a cross-sectional side view of the apparatus of FIGS. 1A and 1B after the workpiece is received between the first roller and the second roller of the apparatus, according to one or more examples of the present disclosure;

FIG. 2H is an expanded view of a portion of FIG. 2G, illustrating a first engagement portion of a first biasing member of the apparatus of FIGS. 1A and 1B, spaced away from the channel surface and positioned over and applying pressure on the edge surface, according to one or more examples of the present disclosure;

FIG. 2I is a cross-sectional side view of the apparatus of FIGS. 1A and 1B after the workpiece is received between the first roller and the second roller of the apparatus and after the rotation-control member of the apparatus is positioned at the second location relative to the frame, according to one or more examples of the present disclosure;

FIG. 3 is a cross-sectional side view of the apparatus of FIGS. 1A and 1B with a different example of the first biasing member of the apparatus, according to one or more examples of the present disclosure;

FIG. 4, is a block diagram of a method of applying pressure to at least a portion of an edge surface of a workpiece, using the apparatus of FIGS. 1A and 1B, according to one or more examples of the present disclosure;

FIG. 5 is a block diagram of aircraft production and service methodology; and

Figure 6:
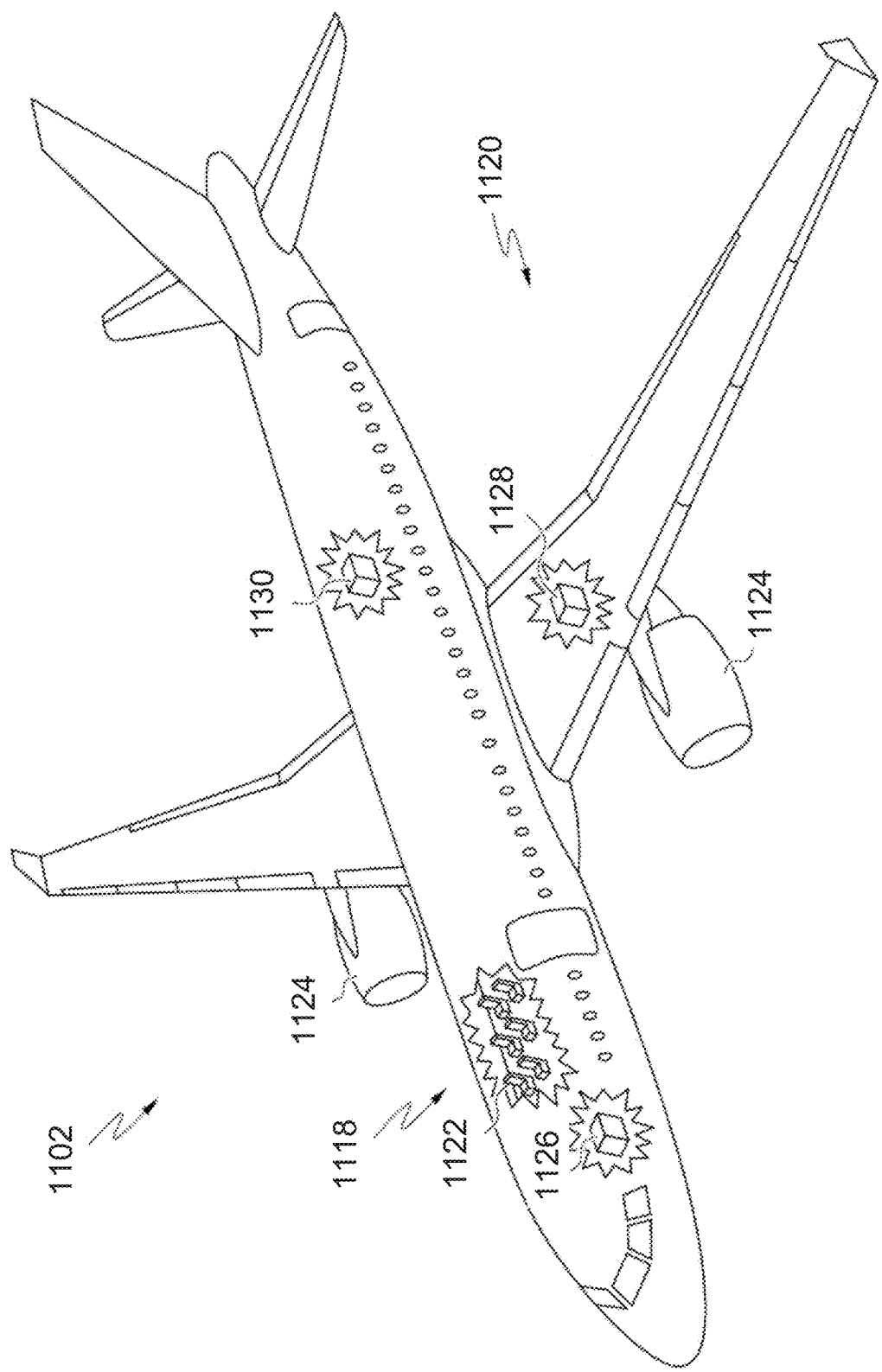

FIG. 6 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 5 and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A and 1B and particularly to, e.g., FIGS. 2A-2I and 3, apparatus 100 for applying pressure to at least a portion of edge surface 192, which bridges opposing faces 194 of workpiece 190, is disclosed. Apparatus 100 comprises frame 110, first roller 120, second roller 130, first biasing member 150, and second biasing member 160. First roller 120 is coupled to frame 110 and is rotatable relative to frame 110 about first pivot axis 125. First roller 120 is translationally fixed relative to frame 110. Second roller 130 is coupled to frame 110 and is rotatable relative to frame 110 about second pivot axis 135. Second roller 130 is translationally fixed relative to frame 110. Second pivot axis 135 is spaced from first pivot axis 125 along first axis 101, which intersects and is perpendicular to first pivot axis 125 and to second pivot axis 135. Rotation-control member 140 is movable relative to frame 110. First biasing member 150 is coupled to frame 110 and is configured to operate in tension. Second biasing member 160 is positioned, in compression, between frame 110 and rotation-control member 140. When rotation-control member 140 is at a first location relative to frame 110, first roller 120 and second roller 130 are rotatable relative to frame 110. When rotation-control member 140 is at a second location relative to frame 110, first roller 120 and second roller 130 are rotationally fixed relative to frame 110. The preceding subject matter of this paragraph characterizes example 1 of the present disclosure.

Apparatus 100 is configured to apply the pressure to at least the portion of edge surface 192 while apparatus 100 is supported by workpiece 190. Apparatus 100 can be installed on workpiece 190 by an operator with minimal efforts, e.g., using only one hand. Furthermore, apparatus 100 is configured to retain on workpiece 190, supported by opposing faces 194 of workpiece 190.

Apparatus 100 applies the pressure uniformly using first biasing member 150, which is configured to operate in tension and conformally contact at least the portion of edge surface 192. The level of pressure is determined by stretching of first biasing member 150 and, in some examples, is controllable by the degree of protrusion of workpiece 190 into apparatus 100.

Specifically, when workpiece 190 is received between first roller 120 and second roller 130 of apparatus 100, first biasing member 150 comes in contact with at least the portion of edge surface 192. Furthermore, first biasing member 150 stretches thereby applying the pressure to at least the portion of edge surface 192.

The location of rotation-control member 140 controls rotation of first roller 120 and second roller 130 thereby determining when workpiece 190 can be received between first roller 120 and second roller 130 and/or retracted from apparatus 100. When workpiece 190 is received between first roller 120 and second roller 130, workpiece 190 forms frictional coupling with first roller 120 and second roller 130, either directly or through first biasing member 150. This frictional coupling ensures that workpiece 190 can be inserted between first roller 120 and second roller 130 and/or retracted from apparatus 100 only when first roller 120 and second roller 130 rotate. In other words, once workpiece 190 is positioned between first roller 120 and second roller 130 and frictionally coupled to first roller 120 and second roller 130, the linear movement of workpiece 190 along second axis 102 corresponds to the rotation of first roller 120 and second roller 130. Workpiece 190 cannot slide through the gap between first roller 120 and second roller 130 when first roller 120 and second roller 130 do not rotate.

When rotation-control member 140 is at the first location relative to frame 110 (e.g., moved by an operator), first roller 120 and second roller 130 are rotatable relative to frame 110. The rotation of first roller 120 and second roller 130 allows workpiece 190 to be inserted between first roller 120 and second roller 130 and/or retracted from apparatus 100. As such, rotation-control member 140 is moved to the first location relative to frame 110 prior to both of these operations and kept at the first location during these operations.

When rotation-control member 140 is at the second location relative to frame 110, first roller 120 and second roller 130 are not rotatable relative to frame 110. Workpiece 190 cannot be inserted between first roller 120 and second roller 130 and/or retracted from apparatus 100. If workpiece 190 has been previously inserted between first roller 120 and second roller 130, workpiece 190 retains the position relative to first roller 120 and second roller 130 and to frame 110. This position is retained even through the pressure is applied to at least the portion of edge surface 192 of workpiece 190. No external support or forces are needed to apparatus 100, which effectively hangs on workpiece 190 due to the frictional coupling between workpiece 190 and each of first roller 120 and second roller 130, either directly or indirectly.

To retract workpiece 190 from apparatus 100 and to stop the application of the pressure onto at least the portion of edge surface 192 of workpiece 190, rotation-control member 140 is first brought back to the first location relative to frame 110. As noted above, first roller 120 and second roller 130 are able to rotate while rotation-control member 140 is at the first location. The rotation of first roller 120 and second roller 130 allows workpiece 190 to advance linearly along second axis 102 and be retracted from apparatus. Workpiece 190 remains frictionally coupled to first roller 120 and second roller 130 while passing the gap between first roller 120 and second roller 130.

The features described above allow, in some examples, for one hand operation of apparatus 100. For example, an operator forces rotation-control member 140 to frame 110 to bring rotation-control member 140 to the first location relative to frame 110. In some examples, frame 110 or, more specifically, first roller 120 and second roller 130 is already contacting workpiece 190 and provide reference support. While keeping rotation-control member 140 in the first location, the operator slides apparatus 100 over workpiece 190 or, more specifically, over edge surface 192 or workpiece 190. The operator then releases rotation-control member 140 thereby bringing rotation-control member 140 to the second location relative to frame 110. No further support is needed by the operator. Apparatus 100 remains supported on workpiece 190, while applying pressure on at least a portion of edge surface 192. To remove apparatus 100, the operator again forces rotation-control member 140 to frame 110 to bring rotation-control member 140 to the first location relative to frame 110. At this time, first roller 120 and second roller 130 are frictionally coupled to workpiece 190 and provide reference support. While keeping rotation-control member 140 at the first location, the operator pulls apparatus 100 along second axis 102 and away from edge surface 192 of workpiece 190.

First roller 120 is coupled to and rotatable relative to frame 110. For example, first roller 120 is coupled relative to frame 110 using a bearing, such as a plain bearing (e.g., bushing, journal bearing, sleeve bearing, rifle bearing, composite bearing), a rolling-element bearing (e.g., ball bearing, roller bearing), a jewel bearing, a fluid bearing, a magnetic bearing, and a flexure bearing. First roller 120 is translationally fixed relative to frame 110 such that first roller 120 does not move relative to frame 110 in the direction along first axis 101. This features controls the gap between first roller 120 and second roller 130 and allows forming frictional coupling between workpiece 190 and each of first roller 120 and second roller 130.

Second roller 130 is coupled and rotatable to frame 110. For example, second roller 130 is coupled relative to frame 110 using a bearing, such as a plain bearing (e.g., bushing, journal bearing, sleeve bearing, rifle bearing, composite bearing), a rolling-element bearing (e.g., ball bearing, roller bearing), a jewel bearing, a fluid bearing, a magnetic bearing, and a flexure bearing. Second roller 130 is also translationally fixed relative to frame 110 such that second roller 130 does not move relative to frame 110 in the direction along first axis 101. Since both first roller 120 and second roller 130 are translationally fixed relative to frame 110, distance D1 between first pivot axis 125 and second pivot axis 135 is constant. This feature is used to apply friction forces on opposing faces 194 or workpiece 190 when workpiece 190 is inserted between first roller 120 and second roller 130.

Rotation-control member 140 is movable relative to frame 110. For example, rotation-control member 140 is slidable relative to frame 110 along second axis 102. In some examples, a linear bearing is positioned between rotation-control member 140 and frame 110 to ensure this moveability. Second biasing member 160 is positioned, in compression, between frame 110 and rotation-control member 140. More specifically, second biasing member 160 urges rotation-control member 140 to the second location relative to frame 110. For example, when an operator applies an external force to rotation-control member 140 relative to frame 110, the operator brings rotation-control member 140 to the first location relative to frame 110 by overcoming the counter-force from second biasing member 160. However, when the operator releases the external force, second biasing member 160 moves rotation-control member 140 back to the second location relative to frame 110 using this counter-force. In some examples, second biasing member 160 is one or more compression springs. When multiple compression springs are used, both springs in each pair of the springs are equally offset from second axis 102.

Referring generally to FIGS. 1A and 1B and particularly to, e.g., FIGS. 2A-2I and 3, first biasing member 150 is elastically stretchable. The preceding subject matter of this paragraph characterizes example 2 of the present disclosure, wherein example 2 also includes the subject matter according to example 1, above.

The stretching of first biasing member 150 is used to control the pressure, applied by first biasing member 150 pressure to at least a portion of edge surface 192 of workpiece 190. More stretching corresponds to the higher pressure and vice versa. Furthermore, the stretching of first biasing member 150 provides space for workpiece 190 when workpiece 190 is inserted between first roller 120 and second roller 130. In some examples, first biasing member 150 is made from an elastically stretchable material, such as an elastomer (e.g., natural rubber, synthetic rubber, nitrile rubber, silicone rubber, urethane rubber, chloroprene rubber, Ethylene Vinyl Acetate (EVA) rubber, and the like).

Referring generally to FIGS. 1A and 1B and particularly to, e.g., FIGS. 2A-2D, first biasing member 150 has an open shape and comprises first end 155 and second end 156. First end 155 is attached to frame 110 at first attachment point 118. Second end 156 is attached to frame 110 at second attachment point 119. The preceding subject matter of this paragraph characterizes example 3 of the present disclosure, wherein example 3 also includes the subject matter according to example 2, above.

When first biasing member 150 has an open shape and first end 155 and second end 156 of first biasing member 150 are attached to frame 110, first biasing member 150 is not compressed between rotation-control member 140 and each of first roller 120 and second roller 130 during operation of apparatus 100. Furthermore, first biasing member 150 is not compressed between workpiece 190 and each of first roller 120 and second roller 130 during operation of apparatus 100. This lack of compression allows more precisely controlled stretching of first biasing member 150. As noted above, stretching of first biasing member 150 controls the pressure, applied to at least a portion of edge surface 192 of workpiece 190.

For example, first biasing member 150 is a stretchable belt. First end 155 is crimped, glued, or otherwise attached frame 110 at first attachment point 118. Similarly, second end 156 is crimped, glued, or otherwise attached to first roller 120 at second attachment point 119. The rotation of first roller 120 and second roller 130 does not change the position of first biasing member 150. As such, the stretching of first biasing member 150 is controlled by workpiece 190, e.g., how far workpiece 190 protrudes past a virtual line extending through first attachment point 118 and second attachment point 119.

Referring generally to FIGS. 1A and 1B and particularly to, e.g., FIGS. 2A-2D, first biasing member 150 is in tension between first attachment point 118 and second attachment point 119. The preceding subject matter of this paragraph characterizes example 4 of the present disclosure, wherein example 4 also includes the subject matter according to example 3, above.

Keeping first biasing member 150 in tension even before workpiece 190 is introduced between first roller 120 and second roller 130 allows increasing the pressure, applied to at least a portion of edge surface 192 of workpiece 190. It should be noted that this pressure depends, at least in part, on the level of stretching of first biasing member 150.

In some examples, the initial stretching (pre-stretching) of first biasing member 150 is at least 10% of the initial unstretched length of first biasing member 150 or, more specifically, at least 25% or even at least 50%. It should be noted that first biasing member 150 is further stretches, besides the initial tension when workpiece 190 contacts first biasing member 150.

Referring generally to FIGS. 1A and 1B and particularly to, e.g., FIGS. 2A-2D, first biasing member 150 is straight when apparatus 100 is not applying pressure to at least the portion of edge surface 192. The preceding subject matter of this paragraph characterizes example 5 of the present disclosure, wherein example 5 also includes the subject matter according to example 4, above.

First biasing member 150 being straight ensures that first biasing member 150 in tension even before workpiece 190 is introduced between first roller 120 and second roller 130 and allows increasing the pressure, applied to at least a portion of edge surface 192 of workpiece 190. It should be noted that this pressure depends, at least in part, on the level of stretching of first biasing member 150.

In some examples, the initial stretching (pre-stretching) of first biasing member 150 is at least 10% of the initial unstretched length of first biasing member 150 or, more specifically, at least 25% or even at least 50%. It should be noted that first biasing member 150 is further stretches, besides the initial tension when first biasing member 150 extends along first axis 101 as shown in FIG. 3A, when workpiece 190 contacts first biasing member 150.

Referring generally to FIGS. 1A and 1B and particularly to, e.g., FIGS. 2A-2D, first biasing member 150 is parallel to first axis 101 when apparatus 100 is not applying pressure to at least the portion of edge surface 192. The preceding subject matter of this paragraph characterizes example 6 of the present disclosure, wherein example 6 also includes the subject matter according to example 5, above.

When first biasing member 150 is parallel to first axis 101, prior to applying pressure to at least the portion of edge surface 192, first biasing member 150 forms a uniform initial contact with this portion of edge surface 192 when workpiece 190 protrudes between first roller 120 and second roller 130. In some examples, edge surface 192 is perpendicular to opposing faces 194 of workpiece 190. It should be noted that opposing faces 194 extend parallel to second axis 102 and perpendicular to first axis 101, when workpiece 190 protrudes between first roller 120 and second roller 130.

To maintain first biasing member 150 parallel to first axis 101, first biasing member 150 is kept in tension between first attachment point 118 and second attachment point 119. Furthermore, first biasing member 150 extends through channel 112 of frame 110.

Referring generally to FIGS. 1A and 1B and particularly to, e.g., FIGS. 2A-2D, second axis 102, perpendicular to first axis 101, bisects first biasing member 150 into two equal parts. The preceding subject matter of this paragraph characterizes example 7 of the present disclosure, wherein example 7 also includes the subject matter according to any one of examples 3 to 6, above.

When second axis 102 bisects first biasing member 150 into two equal parts, first attachment point 118 and second attachment point 119 are positioned at the same distance from second axis 102. As such, when workpiece 190 protrudes between first roller 120 and second roller 130, first straight portion 181 of first biasing member 150, extending between first attachment point 118 and workpiece 190 as well as second straight portion 182 of first biasing member 150, extending between second attachment point 119 and workpiece 190 have the same length and stretch at the same rate as workpiece 190 moves along second axis 102. The pressure applied by engagement portion 161, extending between first straight portion 181 and second straight portion 182 is uniform.

Referring generally to FIGS. 1A and 1B and particularly to, e.g., FIGS. 2A-2D, second distance D4 between first attachment point 118 and second attachment point 119 is greater than first distance D1 between first pivot axis 125 of first roller 120 and second pivot axis 135 of second roller 130. The preceding subject matter of this paragraph characterizes example 8 of the present disclosure, wherein example 8 also includes the subject matter according to any one of examples 3 to 7, above.

Second distance D4 between first attachment point 118 and second attachment point 119 determines the length of first biasing member 150. Furthermore, second distance D4 determined the stretching rate of first biasing member 150 after workpiece 190 comes into contact with workpiece 190 and while workpiece 190 moves along second axis 102. A larger value of second distance D4 provides a smaller stretching rate and more gradual increase of the pressure, applied to at least a portion of edge surface 192. Furthermore, a larger value of second distance D4 corresponds to larger angles between first straight portion 181 and engagement portion 161 and, separately, between second straight portion 182 and engagement portion 161. As such, transitions between edge surface 192 and each of bridges opposing faces 194 is not overly compressed by first biasing member 150.

In some examples, first end 155 of first biasing member 150 is crimped, glued, or otherwise attached to first attachment point 118. In the same or other examples, second end 156 of first biasing member 150 is crimped, glued, or otherwise attached to second attachment point 119.

Referring generally to FIGS. 1A and 1B and particularly to, e.g., FIG. 3, second distance D4 between first attachment point 118 and second attachment point 119 is less than first distance D1 between first pivot axis 125 of first roller 120 and second pivot axis 135 of second roller 130. The preceding subject matter of this paragraph characterizes example 9 of the present disclosure, wherein example 9 also includes the subject matter according to any one of examples 3 to 7, above.

Second distance D4 between first attachment point 118 and second attachment point 119 determines the length of first biasing member 150. Furthermore, second distance D4 determined the stretching rate of first biasing member 150 after workpiece 190 comes into contact with workpiece 190 and while workpiece 190 moves along second axis 102. A smaller value of second distance D4 provides a higher stretching rate. Thereby, more pressure can be exerted by first biasing member 150 for the same level of protrusion of workpiece 190. Furthermore, a smaller value of second distance D4 corresponds to smaller angles between first straight portion 181 and engagement portion 161 and, separately, between second straight portion 182 and engagement portion 161. As such, the pressure is also applied to transitions between edge surface 192 and each of bridges opposing faces 194.

In some examples, first end 155 of first biasing member 150 is crimped, glued, or otherwise attached to first attachment point 118. In the same or other examples, second end 156 of first biasing member 150 is crimped, glued, or otherwise attached to second attachment point 119.

Referring generally to FIGS. 1A and 1B and particularly to, e.g., FIGS. 2A-2I and 3, at least one of first roller 120 or second roller 130 comprises an elastic material. The preceding subject matter of this paragraph characterizes example 10 of the present disclosure, wherein example 10 also includes the subject matter according to any one of examples 1 to 9, above.

The elastic material of first roller 120 or second roller 130 allow inserting workpiece 190 between first roller 120 and second roller 130 while applying force on opposing faces 194 of workpiece 190. This force creates friction between opposing faces 194 of workpiece 190 and each of first roller 120 and second roller 130 thereby forming frictional coupling. The frictional coupling prevents workpiece 190 from sliding relative to apparatus 100 when applying the pressure to at least the portion of edge surface 192 of workpiece 190.

Referring to FIGS. 3C and 3F, when workpiece 190 is inserted between first roller 120 and second roller 130, at least one of first roller 120 or second roller 130 compresses. In these examples, each of first roller 120 and second roller 130 contacts workpiece 190 directly. In some examples, at least a portion of first roller 120 (e.g., forming first outer cylindrical surface 122 of first roller 120) and/or at least a portion of second roller 130 (e.g., forming second outer cylindrical surface 132 of second roller 130) is formed from a compressible material, such as an elastomer (e.g., natural rubber, synthetic rubber, nitrile rubber, silicone rubber, urethane rubber, chloroprene rubber, EVA rubber, and the like).

Referring generally to FIGS. 1A and 1B and particularly to, e.g., FIGS. 2A-2I and 3, second biasing member 160 biases rotation-control member 140 toward first roller 120 and toward second roller 130. The preceding subject matter of this paragraph characterizes example 11 of the present disclosure, wherein example 11 also includes the subject matter according to any one of examples 1 to 10, above.

Second biasing member 160 biases rotation-control member 140 toward first roller 120 and toward second roller 130 thereby urging rotation-control member 140 from the first location relative to frame 110, shown in FIG. 2E, to the second location, shown in FIG. 2G. For example, when an operator stops applying an external force to (e.g., releases) rotation-control member 140, second biasing member 160 moves rotation-control member 140 to the second location without further actions from the operator. It should be note when rotation-control member 140 is at the first location, first roller 120 and second roller 130 are able to rotate and workpiece 190 can be inserted and retracted from the gap between first roller 120 and second roller 130. However, when rotation-control member 140 is at the second location, first roller 120 and second roller 130 are not able to rotate and workpiece 190 can be inserted and retracted from the gap between first roller 120 and second roller 130. Therefore, when workpiece 190 is inserted between first roller 120 and second roller 130, the operator simply needs to release rotation-control member 140 for rotation-control member 140 to move to the second location. Workpiece 190 remains inserted between first roller 120 and second roller 130.

In some examples, second biasing member 160 is a spring, such as a compression spring (configured to operate with a compression load), a constant-rate spring, a variable-rate spring, a flat spring, a machined spring, a serpentine spring, a garter spring, a cantilever spring, a coil spring or helical spring, and the like.

Referring generally to FIGS. 1A and 1B and particularly to, e.g., FIGS. 2A-2I and, when rotation-control member 140 is at the first location relative to frame 110, rotation-control member 140 does not contact either one of first roller 120 or second roller 130. When rotation-control member 140 is at the second location relative to frame 110, rotation-control member 140 contacts, directly, first outer cylindrical surface 122 of first roller 120 and second outer cylindrical surface 132 of second roller 130. The preceding subject matter of this paragraph characterizes example 12 of the present disclosure, wherein example 12 also includes the subject matter according to any one of examples 1 to 11, above.

When rotation-control member 140 is at the first location relative to frame 110, first roller 120 and second roller 130 are able to rotate about first pivot axis 125 and second pivot axis 135, respectively. Rotation-control member 140 does not interfere with this rotation, either directly (e.g., direct contact with first roller 120 and second roller 130) or indirectly (through first biasing member 150). More specifically, at the first location, rotation-control member 140 does not contact either one of first roller 120 or second roller 130. Furthermore, at the first location, rotation-control member 140 does not contact first biasing member 150, which, in some examples, wraps around a portion of first roller 120 and a portion of second roller 130.

On other hand, when rotation-control member 140 is at the second location relative to frame 110, rotation-control member 140 contacts, directly or indirectly, first outer cylindrical surface 122 of first roller 120 and second outer cylindrical surface 132 of second roller 130. More specifically, at the second location, rotation-control member 140 prevents first roller 120 and second roller 130 from rotating about first pivot axis 125 and second pivot axis 135, respectively. In some examples, e.g., shown in FIGS. 3A and 3D, rotation-control member 140 directly contacts first outer cylindrical surface 122 of first roller 120 and second outer cylindrical surface 132 of second roller 130. In other examples, e.g., shown in FIGS. 2A and 2G, rotation-control member 140 indirectly contacts (e.g., through first biasing member 150) first outer cylindrical surface 122 of first roller 120 and second outer cylindrical surface 132 of second roller 130.

Referring to FIGS. 2A and 2B, in some examples, portions of rotation-control member 140 contacting first biasing member 150 are in the form of wedges to provide higher contact areas between rotation-control member 140 and first biasing member 150. Furthermore, the wedges are positioned in such a way that the clockwise rotation of first roller 120 is restricted more than the counterclockwise rotation and that the counterclockwise rotation of second roller 130 is restricted more than the clockwise rotation. The clockwise rotation of first roller 120 and the counterclockwise rotation of second roller 130 correspond to removal of workpiece 190 from apparatus 100.

Referring generally to FIGS. 1A and 1B and particularly to, e.g., FIGS. 2A-2D, frame 110 comprises channel 112, extending along and longitudinally centered on second axis 102, perpendicular to first axis 101. A minimum distance between first roller 120 and second roller 130 is defined by a gap, extending along first axis 101. Second axis 102 bisects the gap between first roller 120 and second roller 130 into two equal parts. The preceding subject matter of this paragraph characterizes example 13 of the present disclosure, wherein example 13 also includes the subject matter according to any one of examples 1 to 12, above.

When workpiece 190 is inserted between first roller 120 and second roller 130, workpiece 190 protrudes into channel 112. In some examples, channel 112 is used for alignment of workpiece 190 within apparatus 100 and, more specifically, relative to first biasing member 150. Channel 112 is aligned relatively to the gap between first roller 120 and second roller 130 along second axis 102 such that both are centered along second axis 102. This axial centering of channel 112 and the gap ensures that workpiece 190 protrudes into channel 112 without interference from frame 110 and ensures the alignment of workpiece 190.

Referring generally to FIGS. 1A and 1B and particularly to, e.g., FIGS. 2A-2D, first biasing member 150 extends across channel 112. The preceding subject matter of this paragraph characterizes example 14 of the present disclosure, wherein example 14 also includes the subject matter according to example 13, above.

When first biasing member 150 extends across channel 112, workpiece 190 can continue protruding into channel 112 after establishing initial contacts with first biasing member 150. This further protrusion into channel 112 causes first biasing member 150 to stretch and applying more pressure to workpiece 190 or, more specifically, to at least a portion of edge surface 192. Workpiece 190 or, more specifically, opposing faces 194 of workpiece 190 remain supported by channel 112 thereby preserving orientation of workpiece 190 relative to frame 110.

Referring generally to FIGS. 1A and 1B and particularly to, e.g., FIGS. 2A-2D, channel 112 has channel width D3, which is constant along channel 112. The gap between first roller 120 and second roller 130 has gap width D2, which is smaller than channel width D3. The preceding subject matter of this paragraph characterizes example 15 of the present disclosure, wherein example 15 also includes the subject matter according to example 13 or 14, above.

Gap width D2 being smaller than channel width D3 is used for alignment of workpiece 190 in channel 112 or, more specifically, when workpiece 190 protrudes between and past first roller 120 and second roller 130 and into channel 112. Channel 112 effectively aligns and centers workpiece 190 along second axis 102. At the same time, workpiece 190 forms frictional coupling with first roller 120 and second roller 130 and this frictional coupling remains while workpiece 190 protrudes between first roller 120 and second roller 130.

It should be noted that in some examples, at least one of first roller 120 and second roller 130 compress when workpiece 190 protrudes between first roller 120 and second roller 130. In other words, gap width D2 of the gap between first roller 120 and second roller 130 can increase.

Referring generally to FIGS. 1A and 1B and particularly to, e.g., FIGS. 2A-2D, channel 112 comprises channel surface 114, extending parallel to first axis 101. The preceding subject matter of this paragraph characterizes example 16 of the present disclosure, wherein example 16 also includes the subject matter according to example 15, above.

Channel surface 114 is operable as a positive stop when workpiece 190 protrudes between and past first roller 120 and second roller 130 and into channel 112. Furthermore, in some examples, channel surface 114 conforms to at least a portion of edge surface 192 of workpiece 190 and is used for alignment of workpiece 190 in channel 112.

The position of channel surface 114 relative to first axis 101 also determined the depth of channel 112 and how far workpiece 190 is able to protrude between first roller 120 and second roller 130 and stretch first biasing member 150. This, in turn, determined the pressure, applied to at least the portion of edge surface 192.

Referring generally to FIGS. 1A and 1B and particularly to, e.g., FIGS. 2A-2D, channel 112 further comprises first side channel surface 113 and second side channel surface 115, parallel to each other and to second axis 102 and extending from channel surface 114. Channel width D3 of channel 112 is the shortest distance between first side channel surface 113 and second side channel surface 115. The preceding subject matter of this paragraph characterizes example 17 of the present disclosure, wherein example 17 also includes the subject matter according to example 16, above.

First side channel surface 113 and second side channel surface 115 are used for alignment of workpiece 190 within channel 112. Specifically, when workpiece 190 slides within channel 112 along second axis 102, first side channel surface 113 and second side channel surface 115 slide relative to and contact opposing faces 194 of workpiece 190.

In some examples, channel width D3 is slightly greater than workpiece width D5 providing slidable engagement between opposing faces 194 of workpiece 190 and each of first side channel surface 113 and second side channel surface 115. First side channel surface 113 and second side channel surface 115 have a minimal surface roughness to ensure sliding.

Referring generally to FIGS. 1A and 1B and particularly to, e.g., FIGS. 2A-2D, channel 112 further comprises first leading surface 116, extending from first side channel surface 113 and oblique relative to second axis 102, and second leading surface 117, extending from second side channel surface 115 and oblique relative to second axis 102. The preceding subject matter of this paragraph characterizes example 18 of the present disclosure, wherein example 18 also includes the subject matter according to example 17, above.

First leading surface 116 and second leading surface 117 direct workpiece 190 into a portion of channel 112 between first side channel surface 113 and second side channel surface 115. Before reaching that portion, workpiece 190 is able to tilt relative to second axis 102 of apparatus 100 thereby helping the operator to insert workpiece 190. However, once workpiece 190 is inserted into the portion of channel 112 between first side channel surface 113 and second side channel surface 115, workpiece 190 cannot further tilt and the orientation of workpiece 190 relative to second axis 102 is preserved. It should be noted that workpiece 190 relative is still able to slide within channel 112 relative to frame 110 and along second axis 102.

Referring generally to FIGS. 1A and 1B and particularly to, e.g., FIGS. 2A-2D, first leading surface 116 and second leading surface 117 of channel 112 define an included angle. Second axis 102 bisects the included angle into two equal parts. The preceding subject matter of this paragraph characterizes example 19 of the present disclosure, wherein example 19 also includes the subject matter according to example 18, above.

First leading surface 116 and second leading surface 117 direct workpiece 190 into a portion of channel 112 between first side channel surface 113 and second side channel surface 115. Before reaching that portion, workpiece 190 is able to tilt relative to second axis 102 of apparatus 100 thereby helping the operator to insert workpiece 190. When second axis 102 bisects the included angle into two equal parts, first leading surface 116 and second leading surface 117 have the same relative orientation to second axis 102 and workpiece 190 is able to tilt to the same degree in both clockwise and counterclockwise direction relative to second axis 102. In some examples, the included angle is between about 20° and 90° or, more specifically, between about 30° and 75°. A larger value of the included angle allows more tilt.

Referring generally to FIGS. 1A and 1B and particularly to, e.g., FIGS. 2A-2D, first axis 101 passes through a first virtual plane, a portion of which is coextensive with first leading surface 116 of channel 112, and through a second virtual plane, a portion of which is coextensive with second leading surface 117 of channel 112. The preceding subject matter of this paragraph characterizes example 20 of the present disclosure, wherein example 20 also includes the subject matter according to example 18 or 19, above.

When first axis 101 passes through the first virtual plane and the second virtual plane, first leading surface 116 and second leading surface 117 start below first axis 101 and continue above first axis 101, referring to the orientation of apparatus 100 shown in FIG. 2A. As such, the guidance of workpiece by first leading surface 116 and second leading surface 117 starts before workpiece 190 is inserted between first roller 120 and second roller 130 and continues after workpiece 190 is inserted between first roller 120 and second roller 130.

In some examples, a portion of first leading surface 116 extending above first axis 101, referring to the orientation of apparatus 100 shown in FIG. 2A, is between about 25% and 75% of first leading surface 116, by area. In the same or other examples, a portion of second leading surface 117 extending above first axis 101, referring to the orientation of apparatus 100 shown in FIG. 2A, is between about 25% and 75% of second leading surface 117, by area.

Referring generally to FIG. 4 and particularly to, e.g., FIGS. 2A-2I and 3, method 700 of applying pressure to at least a portion of edge surface 192 is disclosed. Edge surface 192 bridges opposing faces 194 of workpiece 190. Method 700 uses apparatus 100 that comprises frame 110, first roller 120, second roller 130, rotation-control member 140, first biasing member 150, and second biasing member 160. First roller 120 is coupled to frame 110 and is rotatable relative to frame 110 about first pivot axis 125 and translationally fixed relative to frame 110. Second roller 130 is coupled to frame 110 and is rotatable relative to frame 110 about second pivot axis 135 and is translationally fixed relative to frame 110. Second pivot axis 135 is spaced from first pivot axis 125 along first axis 101, which intersects and is perpendicular to first pivot axis 125 and to second pivot axis 135. Rotation-control member 140 is coupled to frame 110 and is movable relative to frame 110. First biasing member 150 is coupled to frame 110. Second biasing member 160 is positioned, in compression, between frame 110 and rotation-control member 140. Method 700 comprises (block 710) aligning apparatus 100 with workpiece 190 such that edge surface 192 of workpiece 190 is centered along second axis 102 that is perpendicular to first axis 101 and that extends between first pivot axis 125 of first roller 120 and second pivot axis 135 of second roller 130. Method 700 further comprises (block 720) positioning rotation-control member 140 at a first location relative to frame 110 such that first roller 120 and second roller 130 are rotatable relative to frame 110. Method 700 also comprises, with rotation-control member 140 positioned at first location relative to frame 110, (block 730) moving apparatus 100 and workpiece 190 relative to each other, such that workpiece 190 is received between first roller 120 and second roller 130, stretching first biasing member 150, thus applying the pressure to at least the portion of edge surface 192 of workpiece 190, while first roller 120 and second roller 130 apply equal and opposite forces to opposing faces 194 of workpiece 190. Method 700 additionally comprises (block 740) positioning rotation-control member 140 at a second location relative to frame 110, such that first roller 120 and second roller 130 are fixed relative to frame 110, creating a frictional coupling between apparatus 100 and workpiece 190, which maintains pressure, applied to at least the portion of edge surface 192 by first biasing member 150. The preceding subject matter characterizes example 21 of the present disclosure.

Aligning apparatus 100 with workpiece 190 such that edge surface 192 of workpiece 190 is centered along second axis 102 ensures that workpiece 190 can be later inserted between first roller 120 and second roller 130. Furthermore, positioning rotation-control member 140 at the first location relative to frame 110 ensues that first roller 120 and second roller 130 are able rotatable relative to frame 110 as, for example, is shown in FIG. 2B. The rotation of first roller 120 and second roller 130 allows for workpiece 190 to be inserted between first roller 120 and second roller 130.

Moving apparatus 100 and workpiece 190 relative to each other results in workpiece 190 being received between first roller 120 and second roller 130. Upon containing first biasing member 150 with edge surface 192 of workpiece 190, first biasing member 150 stretches. In some examples, the contact with first biasing member 150 and stretching first biasing member 150 occurs before workpiece 190 is received between first roller 120 and second roller 130. Alternatively, the contact with first biasing member 150 and stretching first biasing member 150 occurs before workpiece 190 is received between first roller 120 and second roller 130. This contact and stretching results in first biasing member 150 applying the pressure to at least the portion of edge surface 192 of workpiece 190. The level of pressure depends on the level of stretching and how far workpiece 190 is received between first roller 120 and second roller 130.

When workpiece 190 is received between first roller 120 and second roller 130, first roller 120 and second roller 130 apply equal and opposite forces to opposing faces 194 of workpiece 190. This causes frictional coupling between opposing faces 194 of workpiece 190 and each of first roller 120 and second roller 130, either through a direct contact. This frictional coupling allows workpiece 190 to move along second axis 102 only when first roller 120 and second roller 130 rotate.

Positioning rotation-control member 140 at the second location relative to frame 110 prevents further rotation of first roller 120 and second roller 130. Workpiece 190 cannot longer move along second axis 102. The frictional coupling between opposing faces 194 of workpiece 190 and each of first roller 120 and second roller 130 now translates into a frictional coupling between apparatus 100 and workpiece 190. At this stage, apparatus 100 or, more specifically, at least a portion of first biasing member 150 maintains pressure, applied to at least the portion of edge surface 192 by first biasing member 150.

Overall, apparatus 100 is configured to apply the pressure to at least the portion of edge surface 192 while apparatus 100 is supported by workpiece 190. Apparatus 100 can be installed on workpiece 190 by an operator with minimal efforts, e.g., using only one hand. Furthermore, apparatus 100 is configured to retain on workpiece 190, supported by opposing faces 194 of workpiece 190. Apparatus 100 applies the pressure uniformly using first biasing member 150, which is configured to operate in tension and conformally contact at least the portion of edge surface 192. The level of pressure is determined by stretching of first biasing member 150 and, in some examples, is controllable by the degree of protrusion of workpiece 190 into apparatus 100.

The features, described above, allow, in some examples, for one hand operation of apparatus 100. For example, an operator forces rotation-control member 140 to frame 110 to bring rotation-control member 140 to the first location relative to frame 110. In some examples, frame 110 or, more specifically, first roller 120 and second roller 130 are already contacting workpiece 190 and provide reference support. While keeping rotation-control member 140 in the first location, the operator slides apparatus 100 over workpiece 190 or, more specifically, over edge surface 192 or workpiece 190. The operator then releases rotation-control member 140 thereby bringing rotation-control member 140 to the second location relative to frame 110. No further support is needed by the operator. Apparatus 100 remains supported on workpiece 190, while applying pressure on at least a portion of edge surface 192. To remove apparatus 100, the operator again forces rotation-control member 140 to frame 110 to bring rotation-control member 140 to the first location relative to frame 110. At this time, first roller 120 and second roller 130 are frictionally coupled to workpiece 190 and provide reference support. While keeping rotation-control member 140 at the first location, the operator pulls apparatus 100 along second axis 102 and away from edge surface 192 of workpiece 190.

First roller 120 is coupled to and rotatable relative to frame 110. For example, first roller 120 is coupled relative to frame 110 using a bearing, such as a plain bearing (e.g., bushing, journal bearing, sleeve bearing, rifle bearing, composite bearing), a rolling-element bearing (e.g., ball bearing, roller bearing), a jewel bearing, a fluid bearing, a magnetic bearing, and a flexure bearing. First roller 120 is translationally fixed relative to frame 110 such that first roller 120 does not move relative to frame 110 in the direction along first axis 101. This features controls the gap between first roller 120 and second roller 130 and allows forming frictional coupling between workpiece 190 and each of first roller 120 and second roller 130.

Second roller 130 is coupled and rotatable to frame 110. For example, second roller 130 is coupled relative to frame 110 using a bearing, such as a plain bearing (e.g., bushing, journal bearing, sleeve bearing, rifle bearing, composite bearing), a rolling-element bearing (e.g., ball bearing, roller bearing), a jewel bearing, a fluid bearing, a magnetic bearing, and a flexure bearing. Second roller 130 is also translationally fixed relative to frame 110 such that second roller 130 does not move relative to frame 110 in the direction along first axis 101. Since both first roller 120 and second roller 130 are translationally fixed relative to frame 110, distance D1 between first pivot axis 125 and second pivot axis 135 is constant. This feature is used to apply friction forces on opposing faces 194 or workpiece 190 when workpiece 190 is inserted between first roller 120 and second roller 130.

Rotation-control member 140 is movable relative to frame 110. For example, rotation-control member 140 is slidable relative to frame 110 along second axis 102. In some examples, a linear bearing is positioned between rotation-control member 140 and frame 110 to ensure this moveability. Second biasing member 160 is positioned, in compression, between frame 110 and rotation-control member 140. More specifically, second biasing member 160 urges rotation-control member 140 to the second location relative to frame 110. For example, when an operator applies an external force to rotation-control member 140 relative to frame 110, the operator brings rotation-control member 140 to the first location relative to frame 110 by overcoming the counter-force from second biasing member 160. However, when the operator releases the external force, second biasing member 160 moves rotation-control member 140 back to the second location relative to frame 110 using this counter-force. In some examples, second biasing member 160 is one or more compression springs. When multiple compression springs are used, both springs in each pair of the springs are equally offset from second axis 102.

Referring generally to FIG. 4 and particularly to, e.g., FIGS. 2C-2H, method 700 further comprises (block 735) moving apparatus 100 and workpiece 190 relative to each other, with rotation-control member 140 positioned at the first location relative to frame 110, such that workpiece 190 is extracted from a gap between first roller 120 and second roller 130. The preceding subject matter of this paragraph characterizes example 22 of the present disclosure, wherein example 22 also includes the subject matter according to example 21, above.

While apparatus 100 the pressure to at least the portion of edge surface 192 of workpiece 190, rotation-control member 140 positioned at the second location relative to frame 110 to ensure that the relative position of workpiece 190 and apparatus 100 is maintained. Once further application of the pressure is no longer needed, workpiece 190 removed from apparatus 100. The removal of workpiece 190 requires rotation of first roller 120 and second roller 130, which in turn requires for rotation-control member 140 to be positioned at the first location relative to frame 110. Once rotation-control member 140 is at the first location, apparatus 100 and workpiece 190 can be moved relative to each other, such that workpiece 190 is extracted from the gap between first roller 120 and second roller 130.

In some examples, an operator applies force into rotation-control member 140 relative to frame 110 to move rotation-control member 140 from the second location to the first location. Moving apparatus 100 and workpiece 190 relative to each other involves pulling apparatus 100 relative to workpiece 190 at least in the direction along second axis 102.

Referring generally to FIG. 4 and particularly to, e.g., FIGS. 2A and 2B, according to method 700, (block 720) positioning rotation-control member 140 at the first location relative to frame 110 comprises (block 722) compressing second biasing member 160. The preceding subject matter of this paragraph characterizes example 23 of the present disclosure, wherein example 23 also includes the subject matter according to example 21 or 22, above.

In some examples, second biasing member 160 is used to move rotation-control member 140 from the first location to the second location relative to frame 110 when no external forces are applied between rotation-control member 140 and frame 110. In these examples, to bring rotation-control member 140 back to the first location relative to frame 110 second biasing member 160 is compressed.

In some examples, second biasing member 160 is a spring, such as a compression spring (configured to operate with a compression load), a constant-rate spring, a variable-rate spring, a flat spring, a machined spring, a serpentine spring, a garter spring, a cantilever spring, a coil spring or helical spring, and the like.

Referring generally to FIG. 4 and particularly to, e.g, FIGS. 2A and 2B, according to method 700, (block 722) compressing second biasing member 160 comprises applying an external force to rotation-control member 140 along second axis 102 toward workpiece 190. The preceding subject matter of this paragraph characterizes example 24 of the present disclosure, wherein example 24 also includes the subject matter according to any one of examples 21 to 23, above.

In some examples, second biasing member 160 is used to move rotation-control member 140 from the first location to the second location relative to frame 110 when no external forces are applied between rotation-control member 140 and frame 110. In these examples, to bring rotation-control member 140 back to the first location relative to frame 110 second biasing member 160 is compressed or, more specifically, an external force is applied to rotation-control member 140 along second axis 102 toward workpiece 190. It should be noted that during this operation, frame 110 directly or indirectly engages workpiece 190.

In some examples, second biasing member 160 is a spring, such as a compression spring (configured to operate with a compression load), a constant-rate spring, a variable-rate spring, a flat spring, a machined spring, a serpentine spring, a garter spring, a cantilever spring, a coil spring or helical spring, and the like.

Referring generally to FIG. 4 and particularly to, e.g., FIGS. 2A, 2B, and 2I, according to method 700, (block 740) positioning rotation-control member 140 at the second location relative to frame 110 comprises eliminating the external force, applied to rotation-control member 140 along second axis 102 toward workpiece 190, so that second biasing member 160 extends and moves frame 110 and rotation-control member 140 relative to each other in opposite directions until first roller 120 and second roller 130 become frictionally coupled with rotation-control member 140. The preceding subject matter of this paragraph characterizes example 25 of the present disclosure, wherein example 25 also includes the subject matter according to example 24, above.

In some examples, second biasing member 160 is used to move rotation-control member 140 from the first location to the second location relative to frame 110 when no external forces are applied between rotation-control member 140 and frame 110. In these examples, eliminating the external force, applied to rotation-control member 140 along second axis 102 toward workpiece 190, results in second biasing member 160 extending and moving frame 110 and rotation-control member 140 relative to each other in opposite directions. Rotation-control member 140 is moved until first roller 120 and second roller 130 become frictionally coupled with rotation-control member 140. At this point, rotation-control member 140 is at the second location and first roller 120 and second roller 130 are no longer able to rotate.

In some examples, second biasing member 160 is a spring, positioned between rotation-control member 140 and frame 110. More specifically, second biasing member 160 is a spring, such as a tension spring (configured to operate with a tension load), a compression spring (configured to operate with a compression load), a constant spring, a variable spring, a variable stiffness spring, a flat spring, a machined spring, a serpentine spring, a garter spring, a cantilever spring, a coil spring or helical spring, and the like.

Referring generally to FIG. 4 and particularly to, e.g., FIGS. 2A and 2B, according to method 700, (block 720) positioning rotation-control member 140 at the first location relative to frame 110 comprises (block 724) terminating the direct contact between rotation-control member 140 and each of first roller 120 and second roller 130. The preceding subject matter of this paragraph characterizes example 26 of the present disclosure, wherein example 26 also includes the subject matter according to any one of examples 21 to 25, above.

When rotation-control member 140 is at the second location, rotation-control member 140 directly contacts first roller 120 and second roller 130 or directly contacts first biasing member 150. In either case, rotation-control member 140 is frictionally coupled to first roller 120 and second roller 130 thereby preventing first roller 120 and second roller 130 from rotating. Positioning rotation-control member 140 at the first location relative to frame 110 severs this frictional coupling. More specifically, positioning rotation-control member 140 at the first location terminates the direct contact between rotation-control member 140 and each of first roller 120 and second roller 130 or terminates the direct contact between rotation-control member 140 and first biasing member 150.

In some examples, terminating the direct contact between rotation-control member 140 and each of first roller 120 and second roller 130 or terminating the direct contact between rotation-control member 140 and first biasing member 150 involves applying a force to rotation-control member 140 relative to frame 110.

Referring generally to FIG. 4 and particularly to, e.g., FIGS. 2A-2I and 3, according to method 700, first biasing member 150 has an open shape and comprises first end 155 and second end 156. First end 155 of first biasing member 150 is attached to frame 110 at first attachment point 118. Second end 156 is attached to frame 110 at second attachment point 119, spaced away from first attachment point 118 such that a virtual plane, containing second axis 102 and perpendicular to first axis 101, is between first attachment point 118 and second attachment point 119. The preceding subject matter of this paragraph characterizes example 27 of the present disclosure, wherein example 27 also includes the subject matter according to any one of examples 21 to 26, above.

When first biasing member 150 has an open shape and first end 155 and second end 156 of first biasing member 150 is attached to frame 110, first biasing member 150 is not compressed between rotation-control member 140 and each of first roller 120 and second roller 130 during operation of apparatus 100. Furthermore, first biasing member 150 is not compressed between workpiece 190 and each of first roller 120 and second roller 130 during operation of apparatus 100. This lack of compression allows more precisely controlled stretching of first biasing member 150. As noted above, stretching of first biasing member 150 controls the pressure, applied to at least a portion of edge surface 192 of workpiece 190.

For example, first biasing member 150 is a stretchable belt. First end 155 is crimped, glued, or otherwise attached to frame 110 at first attachment point 118. Similarly, second end 156 is crimped, glued, or otherwise attached to frame 110 at second attachment point 119. When first biasing member 150 is attached to frame 110 (rather than to first roller 120 and/or second roller 130), the rotation of first roller 120 and second roller 130 changes the position of first biasing member 150 and does not stretch first biasing member 150.

Referring generally to FIG. 4 and particularly to, e.g., FIGS. 2A-2D, according to method 700, first biasing member 150 is in tension between first attachment point 118 and second attachment point 119. The preceding subject matter of this paragraph characterizes example 28 of the present disclosure, wherein example 28 also includes the subject matter according to example 27, above.

Keeping first biasing member 150 in tension even before workpiece 190 is introduced between first roller 120 and second roller 130 allows increasing the pressure, applied to at least a portion of edge surface 192 of workpiece 190. It should be noted that this pressure depends, at least in part, on the level of stretching of first biasing member 150.

In some examples, the initial stretching (pre-stretching) of first biasing member 150 is at least 10% of the initial unstretched length of first biasing member 150 or, more specifically, at least 25% or even at least 50%. It should be noted that first biasing member 150 is further stretches, besides the initial tension when first biasing member 150 extends along first axis 101, as shown in FIGS. 2E-2H, when workpiece 190 contacts first biasing member 150.

Referring generally to FIG. 4 and particularly to, e.g., FIGS. 2A-2D, according to method 700, prior to (block 730) moving apparatus 100 and workpiece 190 relative to each other, such that workpiece 190 is received between first roller 120 and second roller 130, first biasing member 150 is straight. The preceding subject matter of this paragraph characterizes example 29 of the present disclosure, wherein example 29 also includes the subject matter according to example 28, above.

First biasing member 150 being straight ensures that first biasing member 150 in tension even before workpiece 190 is introduced between first roller 120 and second roller 130 allows increasing the pressure, applied to at least a portion of edge surface 192 of workpiece 190. It should be noted that this pressure depends, at least in part, on the level of stretching of first biasing member 150.

In some examples, the initial stretching (pre-stretching) of first biasing member 150 is at least 10% of the initial unstretched length of first biasing member 150 or, more specifically, at least 25% or even at least 50%. It should be noted that first biasing member 150 is further stretches, besides the initial tension when first biasing member 150 extends along first axis 101, as shown in FIG. 3A, when workpiece 190 contacts first biasing member 150.

Referring generally to FIG. 4 and particularly to, e.g., FIGS. 2A-2D, according to method 700, second distance D4 between first attachment point 118 and second attachment point 119 is greater than first distance D1 between first pivot axis 125 of first roller 120 and second pivot axis 135 of second roller 130. The preceding subject matter of this paragraph characterizes example 30 of the present disclosure, wherein example 30 also includes the subject matter according to any one of examples 27 to 29, above.

Second distance D4 between first attachment point 118 and second attachment point 119 determines the length of first biasing member 150. Furthermore, second distance D4 determined the stretching rate of first biasing member 150 after workpiece 190 comes into contact with workpiece 190 and while workpiece 190 moves along second axis 102. A larger value of second distance D4 provides a smaller stretching rate and more gradual increase of the pressure, applied to at least a portion of edge surface 192. Furthermore, a larger value of second distance D4 corresponds to larger angles between first straight portion 181 and engagement portion 161 and, separately, between second straight portion 182 and engagement portion 161. As such, transitions between edge surface 192 and each of bridges opposing faces 194 is not overly compressed by first biasing member 150.

In some examples, first end 155 of first biasing member 150 is crimped, glued, or otherwise attached to first attachment point 118. In the same or other examples, second end 156 of first biasing member 150 is crimped, glued, or otherwise attached to second attachment point 119.

Referring generally to FIG. 4 and particularly to, e.g., FIGS. 2C and 2E-2H, according to method 700, (block 730) moving apparatus 100 and workpiece 190 relative to each other, such that workpiece 190 is received between first roller 120 and second roller 130, comprises contacting at least the portion of edge surface 192 of workpiece 190 with engagement portion 161 of first biasing member 150 such that engagement portion 161 conforms and applies the pressure to at least the portion of edge surface 192 of workpiece 190. The preceding subject matter of this paragraph characterizes example 31 of the present disclosure, wherein example 31 also includes the subject matter according to any one of examples 27 to 30, above.

Engagement portion 161 is flexible and conforms to at least the portion of edge surface 192 of workpiece 190. This conformity ensures that the pressure is applied uniformly to at least the portion of edge surface 192 of workpiece 190.

In some examples, engagement portion 161 contacts only a portion of edge surface 192 of workpiece 190. Alternatively, engagement portion 161 contacts only edge surface 192 of workpiece 190 in its entirety.

Referring generally to FIG. 4 and particularly to, e.g., FIGS. 2E-2I, according to method 700, engagement portion 161 of first biasing member 150 interconnects first straight portion 181 and second straight portion 182 of first biasing member 150. First straight portion 181 of first biasing member 150 comprises first end 155 of first biasing member 150, attached to frame 110 at first attachment point 118. Second straight portion 182 of first biasing member 150 comprises second end 156 of first biasing member 150, attached to frame 110 at second attachment point 119. The preceding subject matter of this paragraph characterizes example 32 of the present disclosure, wherein example 32 also includes the subject matter according to example 31, above.

Engagement portion 161 is pulled down along second axis 102 by first straight portion 181 and second straight portion 182, both of which are attached to frame 110. The tension in first straight portion 181 and second straight portion 182 determines the level of pressure, applied to at least the portion of edge surface 192 of workpiece 190.

Referring generally to FIG. 4 and particularly to, e.g., FIGS. 2E, 2G, and 2I, according to method 700, (block 730) moving apparatus 100 and workpiece 190 relative to each other, such that workpiece 190 is received between first roller 120 and second roller 130, further comprises compressing and elastically deforming at least one of first roller 120 or second roller 130 against workpiece 190. The preceding subject matter of this paragraph characterizes example 33 of the present disclosure, wherein example 33 also includes the subject matter according to any one of examples 21 to 32, above.

In some examples, gap width D2 of the gap between first roller 120 and second roller 130 is less than width D5 of workpiece 190. As such, when workpiece 190 is inserted between first roller 120 and second roller at least one of first roller 120 or second roller 130 compresses. This compression creates the friction between opposing faces 194 of workpiece 190 and each of first roller 120 and second roller 130 thereby establishing frictional coupling between workpiece 190 and each of first roller 120 and second roller 130.

In the same or other examples, at least a portion of first roller 120 (e.g., forming first outer cylindrical surface 122 of first roller 120) and/or at least a portion of second roller 130 (e.g., forming second outer cylindrical surface 132 of second roller 130) is formed from a compressible material, such as an elastomer (e.g., natural rubber, synthetic rubber, nitrile rubber, silicone rubber, urethane rubber, chloroprene rubber, EVA rubber, and the like).

Referring generally to FIG. 4 and particularly to, e.g., FIGS. 2A-2D, according to method 700, frame 110 is fixed relative to workpiece 190 while rotation-control member 140 is positioned at the second location. The preceding subject matter of this paragraph characterizes example 34 of the present disclosure, wherein example 34 also includes the subject matter according to any one of examples 21 to 33, above.

When rotation-control member 140 is at the second location, first roller 120 and second roller 130 are not able to rotate relative to rotation-control member 140. Furthermore, when workpiece 190 is inserted between first roller 120 and second roller 130, workpiece 190 is frictionally coupled to each of first roller 120 and second roller 130 and can only change position within apparatus 100 when first roller 120 and second roller 130 rotate. Therefore, without first roller 120 and second roller 130 being able to rotate, workpiece 190 remains stationary within apparatus 100 and in particular, relative to frame 110.

Referring generally to FIG. 4 and particularly to, e.g., FIGS. 2A-2D, according to method 700, frame 110 comprises channel 112, extending along and longitudinally centered on second axis 102, which is perpendicular to first axis 101. Moving apparatus 100 and workpiece 190 relative to each other, such that workpiece 190 is received between first roller 120 and second roller 130, comprises advancing edge surface 192 of workpiece 190 into channel 112. The preceding subject matter of this paragraph characterizes example 35 of the present disclosure, wherein example 35 also includes the subject matter according to any one of examples 21 to 34, above.

When workpiece 190 is received between first roller 120 and second roller 130 and moved relative to apparatus 100, workpiece 190 protrudes into channel 112. In some examples, channel 112 is used for alignment of workpiece 190 within apparatus 100 and, more specifically, relative to first biasing member 150.

In some examples, channel 112 is aligned relatively to the gap between first roller 120 and second roller 130 along second axis 102 such that both are centered along second axis 102. This axial centering of channel 112 and the gap ensures that workpiece 190 protrudes into channel 112 without interference from frame 110 and ensures the alignment of workpiece 190.

Referring generally to FIG. 4 and particularly to, e.g., FIGS. 2E and 2F, according to method 700, channel 112 comprises channel surface 114, extending parallel to first axis 101. Moving apparatus 100 and workpiece 190 relative to each other, such that workpiece 190 is received between first roller 120 and second roller 130, is performed until first biasing member 150 contacts channel surface 114. The preceding subject matter of this paragraph characterizes example 36 of the present disclosure, wherein example 36 also includes the subject matter according to example 35, above.

Channel surface 114 is operable as a positive stop when workpiece 190 protrudes between and past first roller 120 and second roller 130 and into channel 112. Furthermore, in some examples, channel surface 114 conforms to at least a portion of edge surface 192 of workpiece 190 and is used for alignment of workpiece 190 in channel 112.

The position of channel surface 114 relative to first axis 101 also determined the depth of channel 112 and how far workpiece 190 is able to protrude between first roller 120 and second roller 130 and stretch first biasing member 150. This, in turn, determined the pressure, applied to at least the portion of edge surface 192.

Referring generally to FIG. 4 and particularly to, e.g., FIGS. 2E-2H, according to method 700, channel surface 114 is conformal to edge surface 192 of workpiece 190. The preceding subject matter of this paragraph characterizes example 37 of the present disclosure, wherein example 37 also includes the subject matter according to example 36, above.

When workpiece 190 is inserted between first roller 120 and second roller 130 and contacts first biasing member 150, pressure is applied to edge surface 192 of workpiece 190 by first biasing member 150. At least some of this pressure is provided to engagement portion 161 of first biasing member 150, which contacts edge surface 192, by other parts of first biasing member 150, which support engagement portion 161. However, when workpiece 190 is received between first roller 120 and second roller 130 such that first biasing member 150 contacts channel surface 114, additional pressure is provided by channel surface 114. In other words, first biasing member 150 simply transfers this additional pressure from channel surface 114 to edge surface 192 by being positioned and squeezed between channel surface 114 and edge surface 192. The conformity of channel surface 114 to edge surface 192 ensures that this additional pressure is uniform. It should be noted that first biasing member 150 is flexible and able to conform to edge surface 192.

Referring generally to FIG. 4 and particularly to, e.g., FIGS. 2A-2I, channel 112 further comprises first side channel surface 113 and second side channel surface 115, parallel to each other and to second axis 102. According to method 700, (block 730) moving apparatus 100 and workpiece 190 relative to each other, such that workpiece 190 is received between first roller 120 and second roller 130, comprises (block 732) guiding opposing faces 194 of workpiece 190 between first side channel surface 113 and second side channel surface 115. The preceding subject matter of this paragraph characterizes example 38 of the present disclosure, wherein example 38 also includes the subject matter according to any one of examples 35 to 37, above.

First side channel surface 113 and second side channel surface 115 are used for alignment of workpiece 190 within channel 112. Specifically, when workpiece 190 slides within channel 112 along second axis 102, first side channel surface 113 and second side channel surface 115 slide relative to and contact opposing faces 194 of workpiece 190 while preserving the orientation of workpiece 190 relative to second axis 102.

In some examples, channel width D3 is slightly greater than workpiece width D5 providing slidable engagement between opposing faces 194 of workpiece 190 and each of first side channel surface 113 and second side channel surface 115. First side channel surface 113 and second side channel surface 115 have a minimal surface roughness to ensure sliding.

Referring generally to FIG. 4 and particularly to, e.g., FIGS. 2A-2I, according to method 700, (block 732) guiding opposing faces 194 of workpiece 190 between first side channel surface 113 and second side channel surface 115 comprises receiving opposing faces 194 of workpiece 190 between first side channel surface 113 and second side channel surface 115 with a clearance fit. The preceding subject matter of this paragraph characterizes example 39 of the present disclosure, wherein example 39 also includes the subject matter according to example 38, above.

The clearance fit between opposing faces 194 of workpiece 190 between first side channel surface 113 and second side channel surface 115 ensures that workpiece 190 is able to slide relative to frame 110 along second axis 102. Furthermore, the clearance fit ensures that the orientation of workpiece 190 and second axis 102 of apparatus 100 is maintained.

In some examples, channel width D3 is slightly greater than workpiece width D5 providing slidable engagement between opposing faces 194 of workpiece 190 and each of first side channel surface 113 and second side channel surface 115. First side channel surface 113 and second side channel surface 115 have a minimal surface roughness to ensure sliding.

Referring generally to FIG. 4 and particularly to, e.g., FIGS. 2A-2I, according to method 700, a minimum distance between first roller 120 and second roller 130 is defined by a gap extending along first axis 101. Second axis 102 bisects the gap between first roller 120 and second roller 130 into two equal parts. Channel 112 has channel width D3, which is constant along channel 112. The gap between first roller 120 and second roller 130 has gap width D2, which is smaller than channel width D3. The preceding subject matter of this paragraph characterizes example 40 of the present disclosure, wherein example 40 also includes the subject matter according to any one of examples 35 to 39, above.

When workpiece 190 is inserted between first roller 120 and second roller 130, workpiece 190 protrudes into channel 112. In some examples, channel 112 is used for alignment of workpiece 190 within apparatus 100 and, more specifically, relative to first biasing member 150. Channel 112 is aligned relatively to the gap between first roller 120 and second roller 130 along second axis 102 such that both are centered along second axis 102. This axial centering of channel 112 and the gap ensures that workpiece 190 protrudes into channel 112 without interference from frame 110 and ensures the alignment of workpiece 190.

Gap width D2 being smaller than channel width D3 is used for alignment of workpiece 190 in channel 112 or, more specifically, when workpiece 190 protrudes between and past first roller 120 and second roller 130 and into channel 112. Channel 112 effectively aligns and centers workpiece 190 along second axis 102. At the same time, workpiece 190 forms frictional coupling with first roller 120 and second roller 130 and this frictional coupling remains while workpiece 190 protrudes between first roller 120 and second roller 130.

It should be noted that in some examples, at least one of first roller 120 and second roller 130 compress when workpiece 190 protrudes between first roller 120 and second roller 130. In other words, gap width D2 of the gap between first roller 120 and second roller 130 can increase.

Examples of the present disclosure may be described in the context of aircraft manufacturing and service method 1100, as shown in FIG. 5, and aircraft 1102, as shown in FIG. 6. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and methods) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An apparatus for applying pressure to at least a portion of an edge surface, which bridges opposing faces of a workpiece, the apparatus comprising:
  a frame;
  a first roller, coupled to the frame, rotatable relative to the frame about a first pivot axis, and translationally fixed relative to the frame;
  a second roller, coupled to the frame, rotatable relative to the frame about a second pivot axis, and translationally fixed relative to the frame, and wherein the second pivot axis is spaced from the first pivot axis along a first axis, which intersects and is perpendicular to the first pivot axis and to the second pivot axis;
  a rotation-control member, coupled to the frame and movable relative to the frame;
  a first biasing member, coupled to the frame and configured to operate in tension; and
  a second biasing member, positioned, in compression, between the frame and the rotation-control member;
  and wherein:
    when the rotation-control member is at a first location relative to the frame, the first roller and the second roller are rotatable relative to the frame; and when the rotation-control member is at a second location relative to the frame, the first roller and the second roller are rotationally fixed relative to the frame.

2. The apparatus according to claim 1, wherein the first biasing member is elastically stretchable.

3. The apparatus according to claim 2, wherein:
the first biasing member has an open shape and comprises a first end and a second end,
the first end is attached to the frame at a first attachment point, and
the second end is attached to the frame at a second attachment point.

4. The apparatus according to claim 3, wherein the first biasing member is in tension between the first attachment point and the second attachment point.

5. The apparatus according to claim 4, wherein the first biasing member is straight when the apparatus is not applying the pressure to at least the portion of the edge surface.

6. The apparatus according to claim 5, wherein the first biasing member is parallel to the first axis when the apparatus is not applying the pressure to at least the portion of the edge surface.

7. The apparatus according to claim 3, wherein a second axis, perpendicular to the first axis, bisects the first biasing member into two equal parts.

8. The apparatus according to claim 3, wherein a second distance (D4) between the first attachment point and the second attachment point is greater than a first distance (D1) between the first pivot axis of the first roller and the second pivot axis of the second roller.

9. The apparatus according to claim 3, wherein a second distance (D4) between the first attachment point and the second attachment point is less than a first distance (D1) between the first pivot axis of the first roller and the second pivot axis of the second roller.

10. The apparatus according to claim 1, wherein at least one of the first roller or the second roller comprises an elastic material.

11. A method of applying pressure to at least a portion of an edge surface, which bridges opposing faces of a workpiece, using an apparatus that comprises a frame; a first roller, coupled to the frame and rotatable relative about a first pivot axis and translationally fixed relative to the frame; a second roller, coupled to the frame and rotatable relative to the frame about a second pivot axis and translationally fixed relative to the frame, and wherein the second pivot axis is spaced from the first pivot axis along a first axis, which intersects and is perpendicular to the first pivot axis and to the second pivot axis; a rotation-control member, coupled to the frame and movable relative to the frame; a first biasing member, coupled to the frame; and a second biasing member, positioned, in compression, between the frame and the rotation-control member, the method comprising steps of:
aligning the apparatus with the workpiece such that the edge surface of the workpiece is centered along a second axis, that is perpendicular to the first axis and that extends between the first pivot axis of the first roller and the second pivot axis of the second roller;
positioning the rotation-control member at a first location relative to the frame such that the first roller and the second roller are rotatable relative to the frame;
with the rotation-control member positioned at the first location relative to the frame, moving the apparatus and the workpiece relative to each other, such that the workpiece is received between the first roller and the second roller, stretching the first biasing member, thus applying the pressure to at least the portion of the edge surface of the workpiece, while the first roller and the second roller apply equal and opposite forces to the opposing faces of the workpiece; and
positioning the rotation-control member at a second location relative to the frame, such that the first roller and the second roller are fixed relative to the frame, creating a frictional coupling between the apparatus and the workpiece, which maintains the pressure, applied to at least the portion of the edge surface by the first biasing member.

12. The method according to claim 11, further comprising a step of moving the apparatus and the workpiece relative to each other, with the rotation-control member positioned at the first location relative to the frame, such that the workpiece is extracted from a gap between the first roller and the second roller.

13. The method according to claim 11, wherein the step of positioning the rotation-control member at the first location relative to the frame comprises a step of compressing the second biasing member.

14. The method according to claim 11, wherein the step of compressing the second biasing member comprises applying an external force to the rotation-control member along the second axis toward the workpiece.

15. The method according to claim 14, wherein the step of positioning the rotation-control member at the second location relative to the frame comprises eliminating the external force, applied to the rotation-control member along the second axis toward the workpiece, so that the second biasing member extends and moves the frame and the rotation-control member relative to each other in opposite directions until the first roller and the second roller become frictionally coupled with the rotation-control member.

16. The method according to claim 11, wherein the step of positioning the rotation-control member at the first location relative to the frame comprises terminating direct contact between the rotation-control member and each of the first roller and the second roller.

17. The method according to claim 11, wherein:
the first biasing member has an open shape and comprises a first end and a second end,
the first end of the first biasing member is attached to the frame at a first attachment point,
the second end of the first biasing member is attached to the frame at a second attachment point, spaced away from the first attachment point such that a virtual plane, containing the second axis and perpendicular to the first axis, is between the first attachment point and the second attachment point.

18. The method according to claim 17, wherein the first biasing member is in tension between the first attachment point and the second attachment point.

19. The method according to claim 18, wherein, prior to the step of moving the apparatus and the workpiece relative to each other, such that the workpiece is received between the first roller and the second roller, the first biasing member is straight.

20. The method according to claim 17, wherein the step of moving the apparatus and the workpiece relative to each other, such that the workpiece is received between the first roller and the second roller, comprises contacting at least the portion of the edge surface of the workpiece with a engagement portion of the first biasing member such that the engagement portion conforms and applies the pressure to at least the portion of the edge surface of the workpiece.

* * * * *